(12) United States Patent
Goja

(10) Patent No.: US 11,526,973 B2
(45) Date of Patent: Dec. 13, 2022

(54) PREDICTIVE PARCEL DAMAGE IDENTIFICATION, ANALYSIS, AND MITIGATION

(71) Applicant: United Parcel Service of America, Inc., Atlanta, GA (US)

(72) Inventor: Asheesh Goja, Upper Saddle River, NJ (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 97 days.

(21) Appl. No.: 17/032,958

(22) Filed: Sep. 25, 2020

(65) Prior Publication Data

US 2021/0019871 A1 Jan. 21, 2021

Related U.S. Application Data

(63) Continuation of application No. 16/148,104, filed on Oct. 1, 2018, now Pat. No. 10,796,423.

(Continued)

(51) Int. Cl.
| | |
|---|---|
| *G06K 9/00* | (2022.01) |
| *G06T 7/00* | (2017.01) |
| *G06Q 10/06* | (2012.01) |
| *G06Q 10/00* | (2012.01) |
| *G06T 7/73* | (2017.01) |
| *G06N 20/00* | (2019.01) |

(Continued)

(52) U.S. Cl.
CPC ............ *G06T 7/0002* (2013.01); *G06K 9/628* (2013.01); *G06K 9/6256* (2013.01); *G06N 5/022* (2013.01); *G06N 20/00* (2019.01); *G06Q 10/00* (2013.01); *G06Q 10/06* (2013.01); *G06Q 10/06395* (2013.01); *G06T 7/74* (2017.01); *B64C 39/024* (2013.01); *B64C 2201/027* (2013.01); *B64C 2201/123* (2013.01); *B64C 2201/128* (2013.01); *B64C 2201/141* (2013.01); *G06T 2207/20076* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| 5,666,493 A | 9/1997 | Wojcik et al. |
| 7,742,928 B2 | 6/2010 | Reynolds et al. |

(Continued)

FOREIGN PATENT DOCUMENTS

WO 2007/139509 A2 12/2007

*Primary Examiner* — Randolph I Chu

(74) *Attorney, Agent, or Firm* — Shook, Hardy & Bacon L.L.P

(57) ABSTRACT

A first parcel digital image associated with a first interaction point is received. The first parcel digital image may be associated with a first parcel being transported to or from the first interaction point. At least a second parcel digital image associated with at least a second interaction point is further be received. The second parcel digital image may be associated with the first parcel being transported to or from the second interaction point. A first parcel damage analysis is automatically generated based at least in part on analyzing the first parcel digital image and the at least second parcel image. The damage analysis can include determining whether the first parcel is damaged above or below a threshold.

20 Claims, 10 Drawing Sheets

Related U.S. Application Data

(60) Provisional application No. 62/565,404, filed on Sep. 29, 2017.

(51) Int. Cl.
*G06K 9/62* (2022.01)
*G06N 5/02* (2006.01)
*B64C 39/02* (2006.01)

(56) References Cited

U.S. PATENT DOCUMENTS

| | | |
|---|---|---|
| 8,712,893 B1 | 4/2014 | Brandmaier et al. |
| 9,846,854 B1 | 12/2017 | Lee et al. |
| 10,138,060 B1 | 11/2018 | Mantha et al. |
| 10,268,892 B1 * | 4/2019 | Miller ................ G06F 1/1656 |
| 2003/0160096 A1 | 8/2003 | Morimoto |
| 2015/0063539 A1 | 3/2015 | Hayler et al. |
| 2017/0313421 A1 | 11/2017 | Gil |
| 2018/0002039 A1 | 1/2018 | Finn et al. |
| 2019/0057454 A1 | 2/2019 | Komenda et al. |
| 2019/0102874 A1 | 4/2019 | Goja |

* cited by examiner

PREDICTIVE PARCEL DAMAGE IDENTIFICATION, ANALYSIS, AND MITIGATION

CROSS-REFERENCE TO RELATED APPLICATIONS

This application is a continuation of U.S. patent application Ser. No. 16/148,104 filed Oct. 1, 2018 which is claims priority to U.S. Patent Application Ser. No. 62/565,404 filed Sep. 29, 2017, entitled SYSTEMS AND METHODS FOR PREDICTIVE PARCEL DAMAGE IDENTIFICATION, ANALYSIS, AND MITIGATION; each application of which is hereby incorporated by reference in its entirety.

FIELD

Aspects of the present disclosure relate to the capture of digital images of parcels; the detection, characterization, diagnosis, cost analysis, and root cause analysis of any damage based upon machine learning; and the automatic mitigation of the root cause of damage.

BACKGROUND

Parcels (e.g., packages, containers, letters, items, pallets, etc.) are transported from an origin to a destination and may have various intermediate locations (e.g., sorting facilities) and interactions during such transport. Naturally, an increase in the number of locations and interactions during transport increases the number of possible damaging situations for the parcels. If a package is damaged during the transport process, a shipping and logistics provider may be responsible for the damages. However, it may be difficult to determine if the parcel was damaged at the time it was picked up or where the parcel may have been damaged during transport. Further, if a particular point of damage is located, it may be difficult to mitigate such damaging conditions in an efficient manner.

Existing technologies for identifying and/or assessing damaged parcels may include software applications that are passively configured to receive manual input from users indicating damage has occurred to particular parcels. Accordingly, these applications only identify the damage based on user input. These applications and other technologies (e.g., Internet of Things (IoT) devices) have shortcomings by failing to provide: automated detection of the damage, diagnosis or classification of the damage, cost analysis of the damage, machine learning associated with the damage, modifications of conditions or devices, and other functionalities. Various embodiments of the present disclosure improve these existing technologies by overcoming some or each of these shortcomings, as described in more detail herein.

SUMMARY

Various embodiments of the present disclosure are directed to an apparatus, a computer-implemented method, and a system. In some embodiments, the apparatus is used for predictive parcel damage mitigation in a parcel transit network. The parcel transit network may include an origin interaction point, a plurality of parcel interaction points (e.g., air gateways and consolidation hubs), and a destination interaction point. The apparatus can include at least one processor and at least one memory including computer program code. The at least one memory and the computer program code can be configured to, with the at least one processor, cause the apparatus to perform the following operations according to certain embodiments. A first plurality of parcel digital images is received from the origin interaction point. The first plurality of parcel digital images is associated with a parcel being transported from the origin interaction point to the destination interaction point via the plurality of parcel interaction points. A second plurality of parcel digital images of the parcel is received from a first parcel interaction point of the plurality of parcel interaction points. The first plurality of parcel digital images and the second plurality of parcel digital images may represent a plurality of fields of view of the parcel. A first parcel damage analysis is programmatically generated based upon the first plurality of parcel digital images, the second plurality of parcel digital images, and a machine learning model.

In some embodiments, the computer-implemented method includes the following operations. A first parcel digital image associated with a first interaction point is received. The first parcel digital image may be associated with a first parcel being transported to or from the first interaction point. At least a second parcel digital image associated with at least a second interaction point is further be received. The second parcel digital image may be associated with the first parcel being transported to or from the second interaction point. A first parcel damage analysis is automatically generated based at least in part on analyzing the first parcel digital image and the at least second parcel image. The damage analysis can include determining whether the first parcel is damaged above or below a threshold.

In some embodiments, the system includes at least one first computing device having at least one processor and at least one computer readable storage medium having program instructions embodied therewith. In some embodiments, the program instructions are readable or executable by the at least one processor to cause the system to perform the following operations. At least a first parcel digital image captured from one or more physical locations within a parcel transit network is received. The first parcel digital image includes a representation of a first parcel. The parcel transit network may correspond to a plurality of physical locations traversed by the first parcel along one or more carrier routes. In response to analyzing the at least first parcel digital image, a likelihood associated with a damage of the first parcel is determined. Based at least on the determining of the likelihood associated with the damage, a signal is provided to a second computing device. The providing causes the computing device to be modified or a condition to be modified.

BRIEF DESCRIPTION OF THE DRAWINGS

Figure 1:
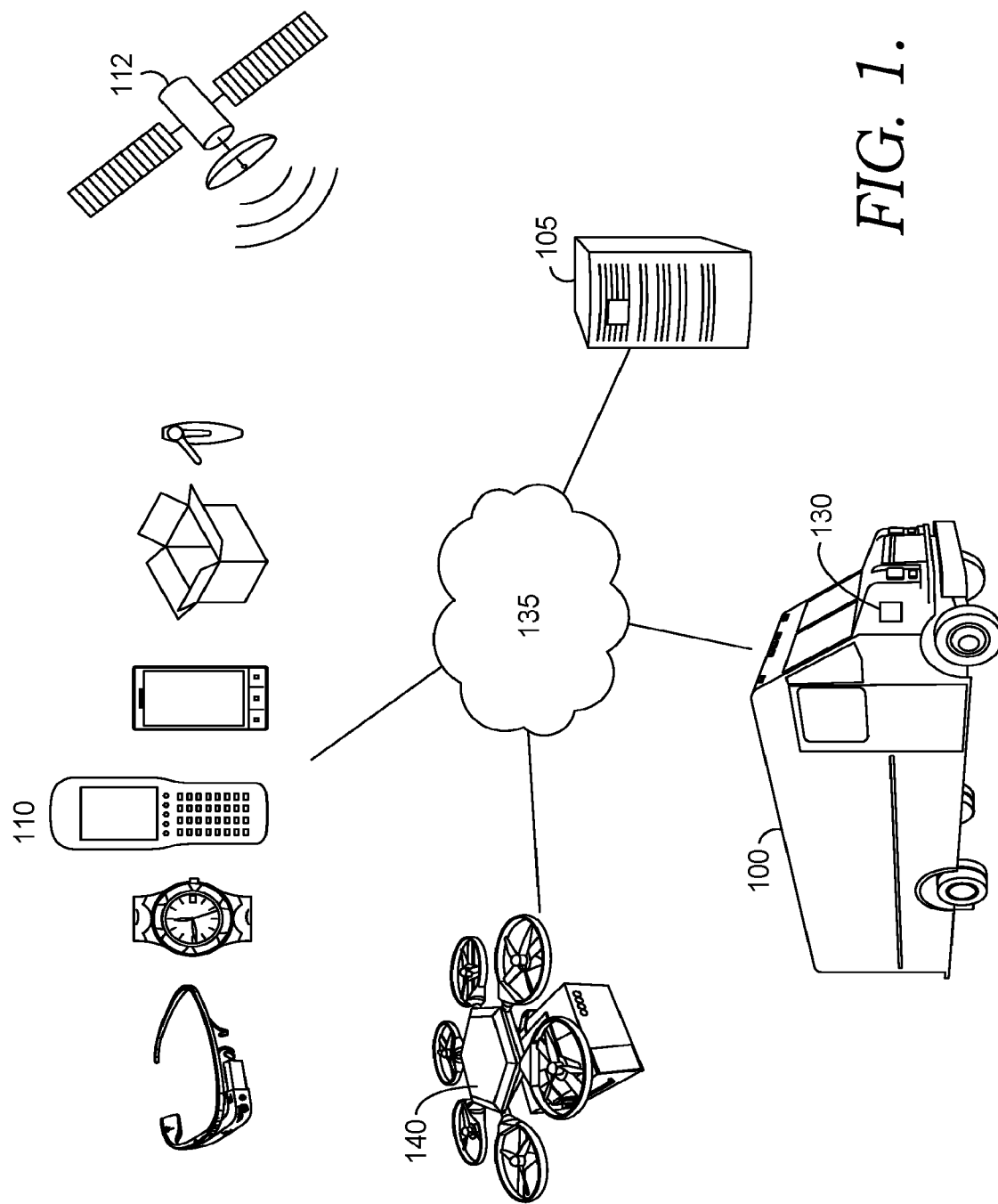
Figure 2:
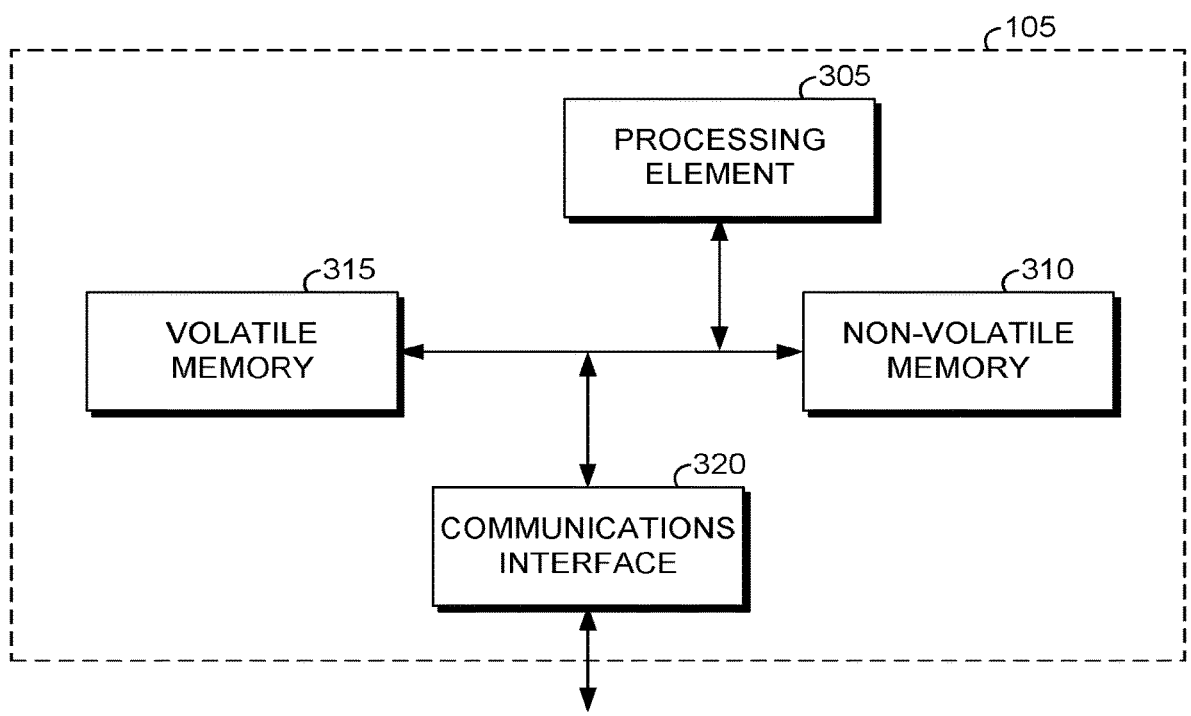
Figure 3:
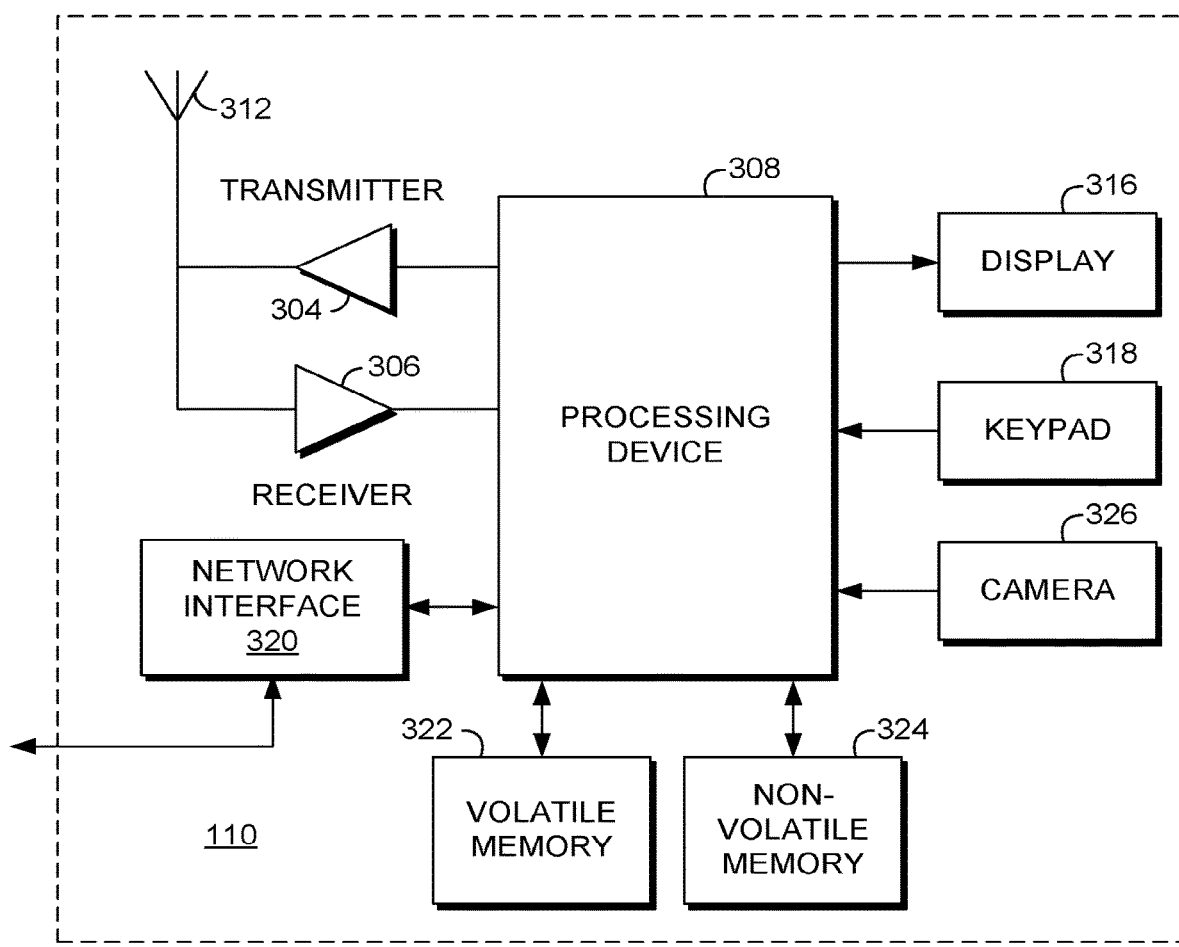
Figure 4:
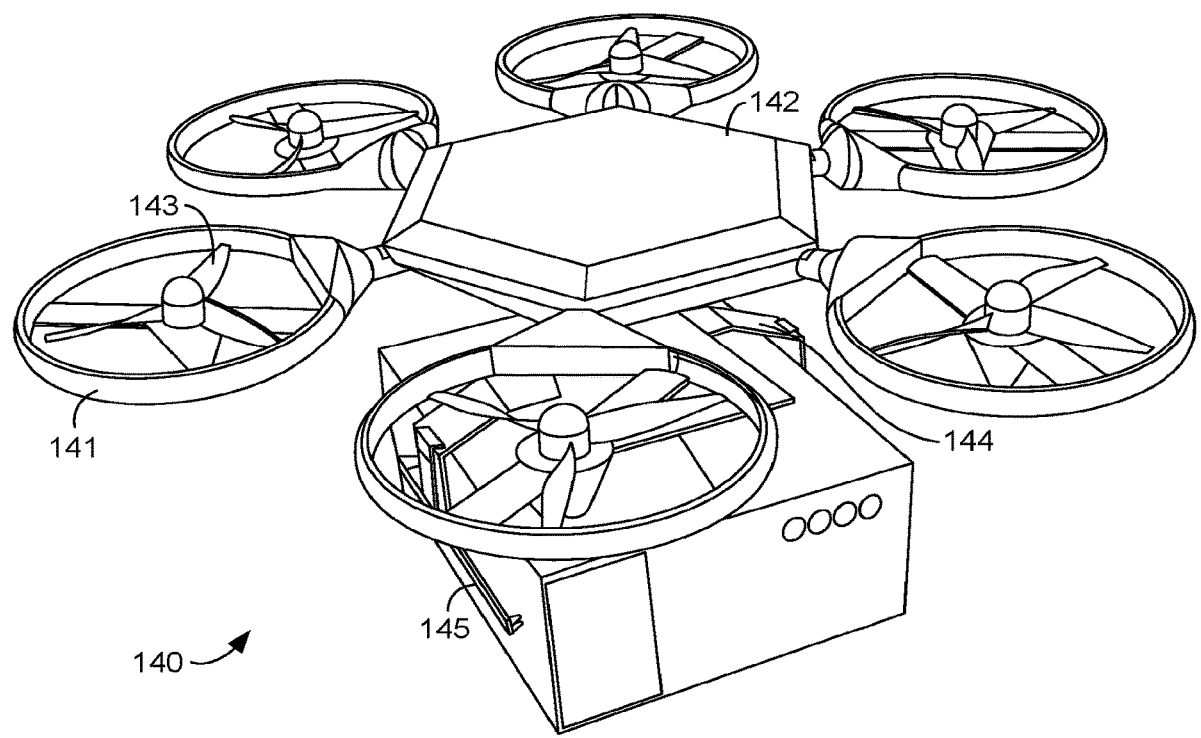
Figure 5:
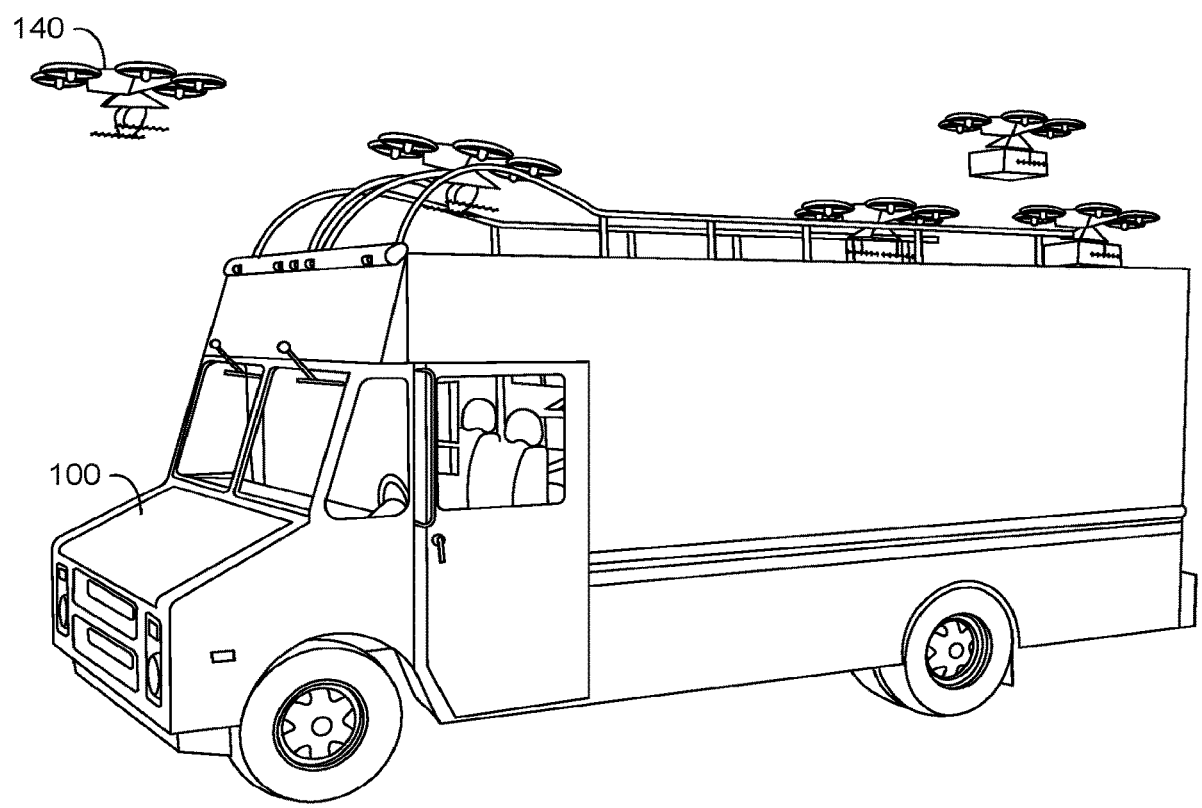
Figure 6A:
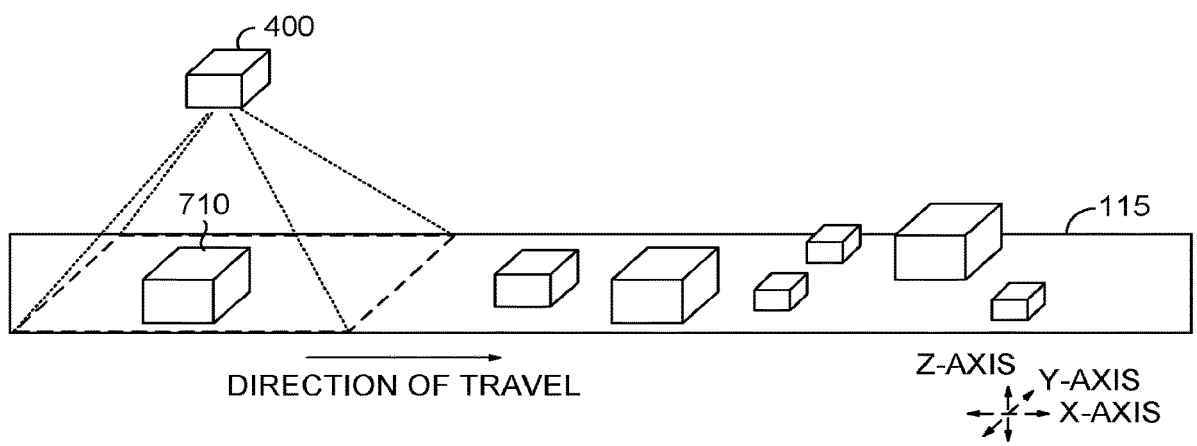
Figure 6B:
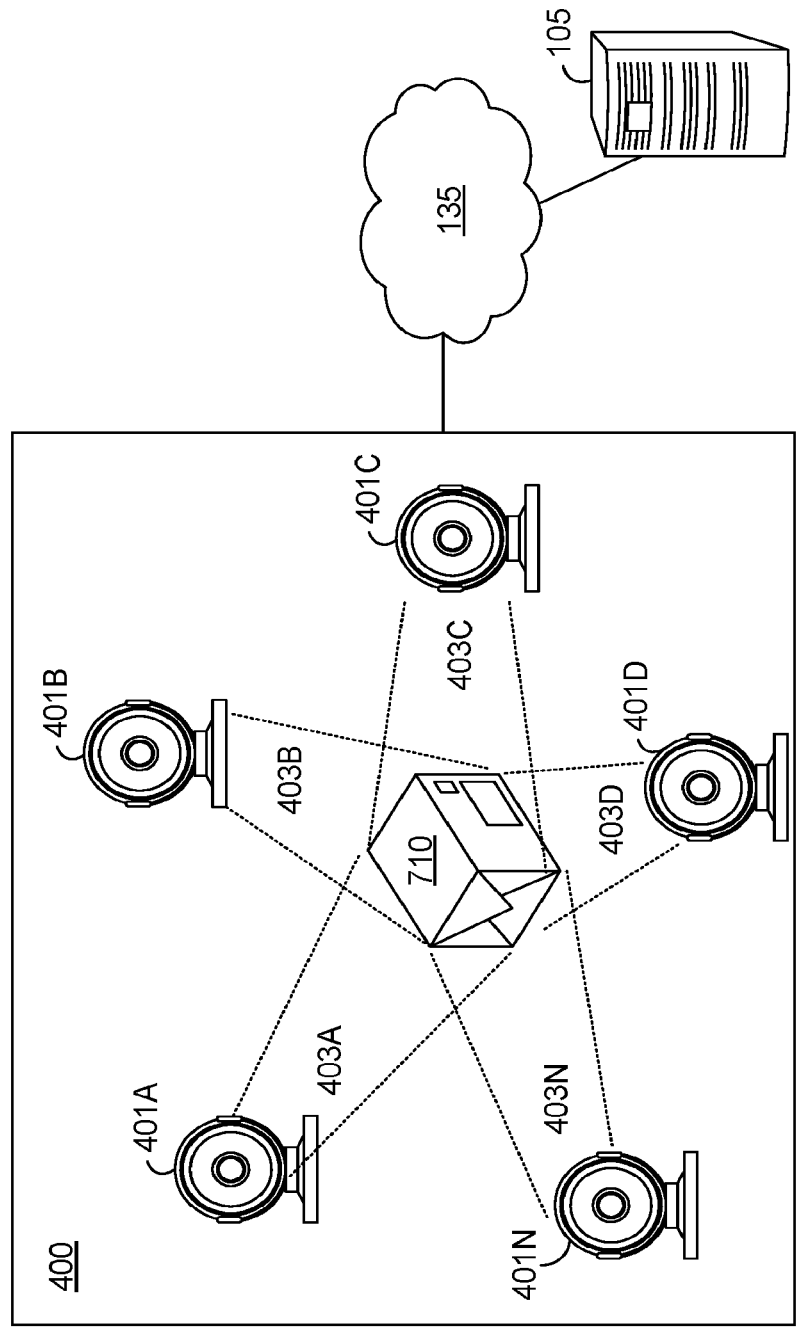
Figure 7:
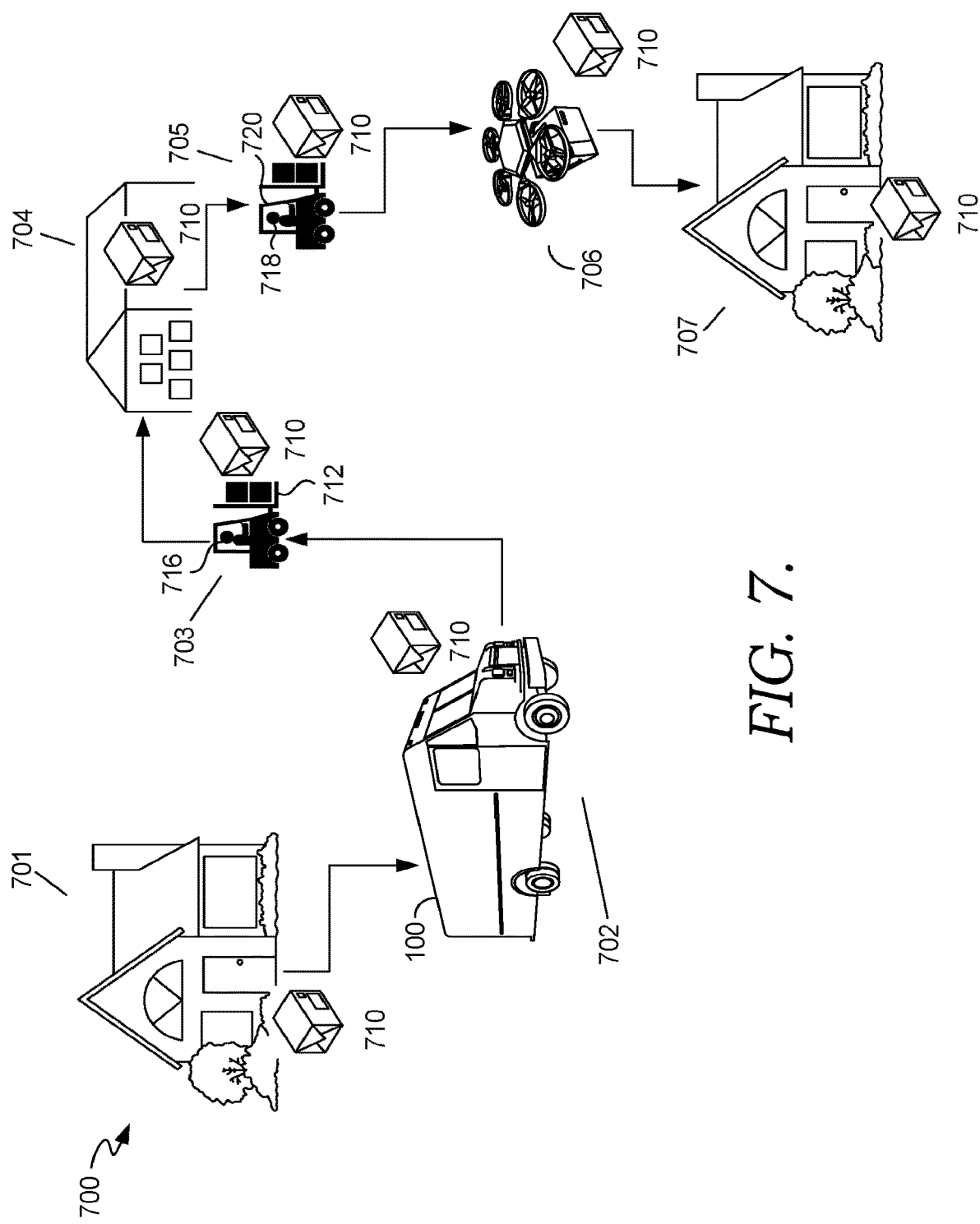
Figure 8:
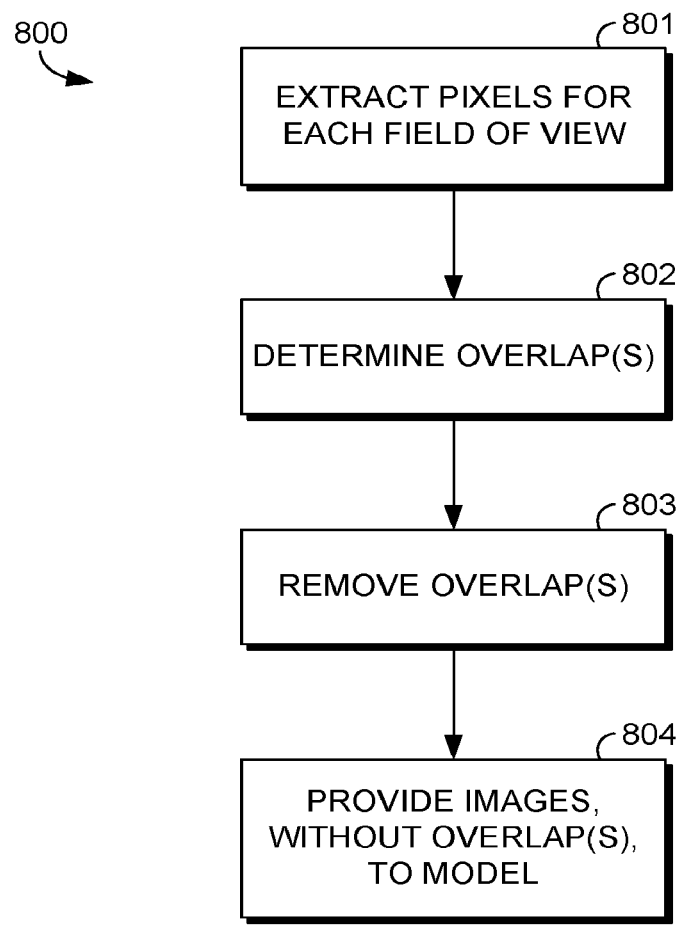
Figure 9:
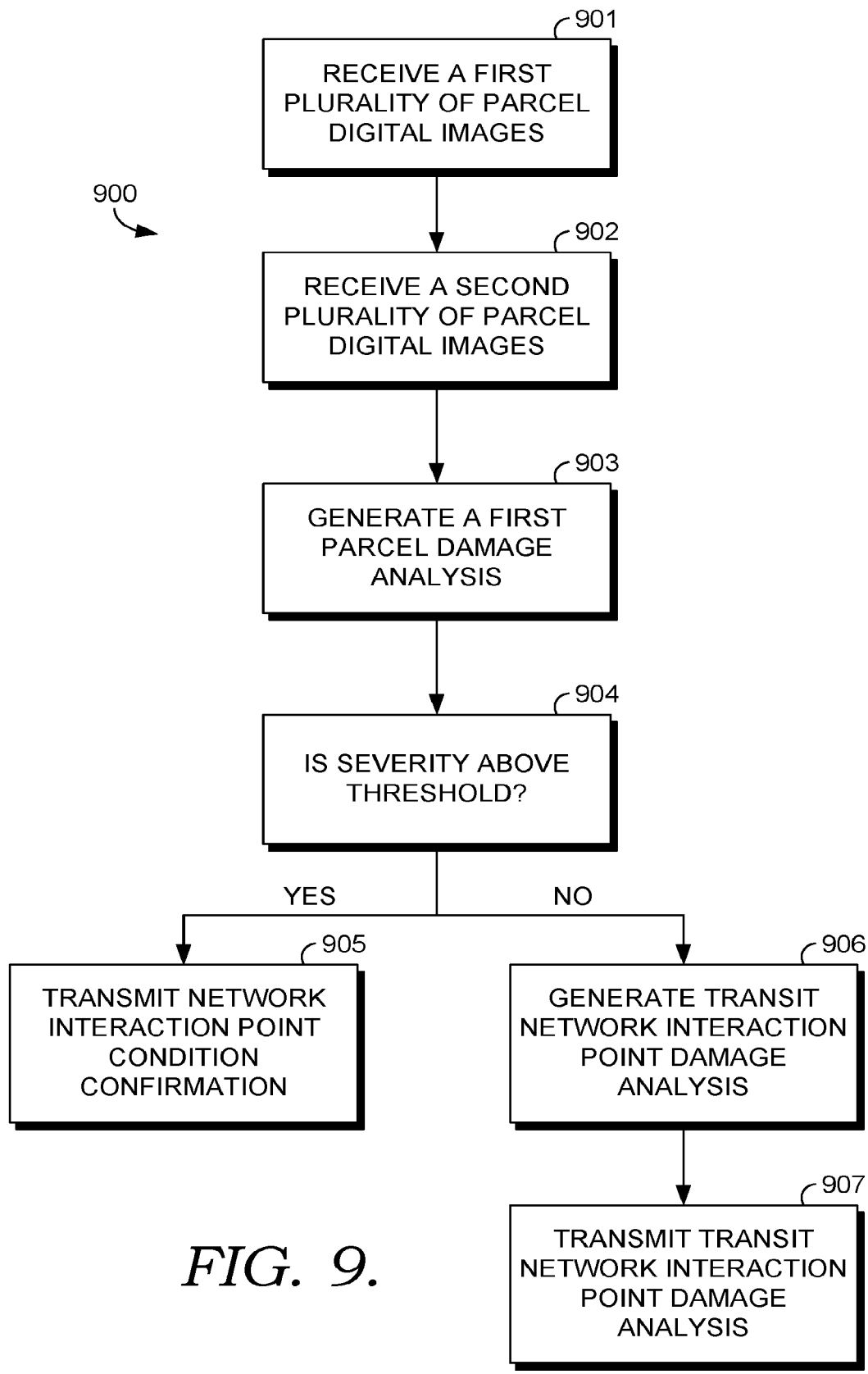

Having thus described the disclosure in general terms, reference will now be made to the accompanying drawings, which are not necessarily drawn to scale, and wherein:

FIG. 1 provides an illustration of an exemplary embodiment of the present disclosure;

FIG. 2 provides a schematic of an analysis computing entity according to one embodiment of the present disclosure;

FIG. 3 provides an illustrative schematic representative of a mobile computing entity 110 that can be used in conjunction with embodiments of the present disclosure;

FIG. 4 illustrates an example autonomous vehicle that may be utilized in various embodiments;

FIG. 5 illustrates an example manual delivery vehicle according to various embodiments;

FIGS. 6A and 6B includes an illustration of a conveying mechanism according to one embodiment of the present disclosure and an exemplary multi-view image capture system for use with embodiments of the present disclosure;

FIG. 7 illustrates an exemplary parcel transit route for use with embodiments of the present disclosure;

FIG. 8 illustrates an exemplary process for use with embodiments of the present disclosure; and FIG. 9 illustrates an exemplary process for use with embodiments of the present disclosure.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices/entities, such as, for example, one or more servers, relays, routers, network access points, base stations, hosts, and/or the like, sometimes referred to herein as a "network." Similarly, where a computing device is described herein to transmit data to another computing device, it will be appreciated that the data may be sent directly to another computing device or may be sent indirectly via one or more intermediary computing devices/entities, such as, for example, one or more servers, relays, routers, network access points, base stations, hosts, and/or the like.

The term "parcel damage mitigation" refers to measures that entities traversing and/or overseeing a parcel transit network may employ to mitigate damage caused to parcels in transit while traversing the parcel transit network. Examples of parcel damage mitigation may include adjustment of temperature (or other environmental parameters) at a location within the parcel transit network, decommissioning (temporary or otherwise) of a conveyor belt or other vehicle within the parcel transit network, adjusting the speed of a conveyor belt or other vehicle within the parcel transit network, and the like.

The terms "parcel transit network," "carrier's logistic network," or "transportation and logistics network" refer to a series of one or more physical locations traversed by a parcel, carrier, and/or carrier apparatus (e.g., vehicle, drone, etc.) between an origin location (e.g., drop-off location for a package) and a destination location (e.g., an intermediate sorting facility and/or a destination address). For example, a parcel transit network can be or include some or each aspect of the parcel transit route 700 of FIG. 7.

The term "origin interaction point" refers to a physical location within a parcel transit network or carrier's logistic network where a particular parcel is first encountered. Examples of origin interaction points include a residence, a transit network drop box, and a place of business.

The term "parcel interaction point" refers to a physical location within a parcel transit network or carrier's logistic network where any interaction with a particular parcel may occur. Interaction may be defined as any physical contact (e.g., the picking up of a parcel), including transfer from one location and/or vehicle to another. Examples of physical locations and vehicles within the parcel transit network are outlined herein and are apparent to those skilled in the art. As described herein, one or more digital image capturing mechanisms/devices can be located at parcel interaction points and/or anywhere between parcel interaction points within the parcel transit network.

The term "destination interaction point" refers to a physical location within a parcel transit network where a particular parcel is intended to be delivered. As such, the destination interaction point, in some embodiments, is the final intended parcel interaction point along the traversal of the parcel transit network for the particular parcel. Alternatively or additionally, in some embodiments, the destination interaction point is an intermediate point along traversal of the parcel transit network, such as an intermediate facility (e.g., an air gateway or consolidation hub).

The term "parcel digital image" refers to a digitally captured image (e.g., a digital photo) and/or set of images (e.g., a video sequence) representing one or more aspects of a particular parcel within a parcel transit network. In some embodiments, a parcel digital image of a particular parcel is captured using a digital camera. In other embodiments, a parcel digital image is captured using other means of capturing digital representations or the like of a particular parcel.

The terms "parcel," "item," and/or "shipment" refer to any tangible and/or physical object, such as a package, a container, a load, a crate, items banded together, an envelope, suitcases, vehicle parts, pallets, drums, vehicles, and the like sent through a delivery service from a first geographical location to one or more other geographical locations.

The terms "field of view," "fields of view," and "pose range" refer to a restriction to what is visible and/or available to be captured by a digital image capturing apparatus (e.g., camera) or device.

The term "parcel damage analysis" refers to an analysis of damage caused to a parcel (e.g., external or internal) by any of a plurality of external factors (e.g., related to a parcel transit network or other factor). For instance, damage analysis may include the quantity of parcels damages, the type of damage, and/or the severity of damage caused to one or more parcels.

The term "threshold" refers to a limit associated with a level of parcel damage that is deemed acceptably by a transit network provider. For example, a transit network provider may deem it acceptable for a parcel to have minimal water damage that smudges lettering as part of an intended recipient's address on an exterior of the parcel. Such minimal damage may be associated with a numerical value and/or category that may be compared with the threshold. In another example, the transit network provider may deem it unacceptable (e.g., outside, below, or above the threshold) for a parcel to have a shredded or otherwise compromised corner. Such unacceptable damage may be associated with a numerical value and/or category that may be compared with the threshold.

The term "transit network interaction point condition confirmation" refers to a digital representation of a positive, safe, and/or authorized condition of a transit network interaction point. For example, a transit network interaction point condition confirmation may comprise an indication that all conditions at an interaction point are safe for the transit of a parcel to remain or continue traversing a transmit network, which indicates damage has not been detected above or below a threshold.

The term "transit network interaction point damage analysis" refers to a parcel damage analysis that is associated with a point within a transit network. In embodiments, the point within the transit network is a known or predetermined interaction point for a particular parcel. In embodiments, a parcel may have passed through (i.e., interacted with) a transit network point without having been damaged. In such an embodiment, a transit network interaction point damage analysis may include a notification reflecting such successful traversal.

It should be appreciated that the term "programmatically expected" indicates machine prediction of occurrence of certain events.

As used herein, the term "likelihood" refers to a measure of probability for occurrence of a particular event. For example, in some embodiments, an output layer of a machine learning model may output a floating point value score or probability that an input image is of a particular classification (e.g., a damaged parcel).

The term "machine learning model" refers to a model that is used for machine learning tasks or operations. A machine learning model can comprise a title and encompass one or more input images or data, target variables, layers, classifiers, etc. In various embodiments, a machine learning model can receive an input (e.g., an image taken at an interaction point), and based on the input identify patterns or associations in order to predict a given output (e.g., classify the image as either a damaged or non-damaged parcel). Machine learning models can be or include any suitable model, such as one or more: neural networks, word2Vec models, Bayesian networks, Random Forests, Boosted Trees, etc. "Machine learning" as described herein, in particular embodiments, corresponds to algorithms that parse or extract features of historical data (e.g., a data store of historical images), learn (e.g., via training) about the historical data by making observations or identifying patterns in data, and then receive a subsequent input (e.g., a current image) in order to make a determination, prediction, and/or classification of the subsequent input based on the learning without relying on rules-based programming (e.g., conditional statement rules).

The term "target variable" refers to a value or classification that a machine learning model is designed to predict. In some embodiments, historical data is used to train a machine learning model to predict the target variable (e.g., whether damage is classified as "water damage," "heat damage," "compression damage," "tear damage," etc.). Historical observations of the target variable are used for such training.

The term "machine learning model experiment" refers to a method for predicting the target variables that comprise a machine learning model. The machine learning model experiment represents a certain set of features provided to a certain algorithm with a certain set of hyper-parameters. A machine learning model experiment can have associated therewith a machine learning model experiment name and a machine learning model experiment description.

The term "machine learning model selection" refers to an electronic selection of a machine learning model available for inclusion in a machine learning model experiment. A machine learning model selection can be one or more of a touch screen input, mouse click or keyboard entry input provided to a computing device, and the machine learning model selection can be made from a displayed menu of several available machine learning models.

The terms "dataset" and "data set" refer to a collection of data. A data set can correspond to the contents of a single database table, or a single statistical data matrix, where every column of the table represents a particular variable, and each row corresponds to a given member of the data set in question. The data set can be comprised of tuples.

The term "transit network interaction point damage mitigation instruction" refers to a set of digital instructions providing signals to any of one or more parcel interaction points (or devices within such points) within a transit parcel network or instructions to other devices (e.g., notifications to any computing device at any location indicating steps to take to mitigate the damage) regarding modification of any of one or more environmental or structural conditions. In some embodiments, the digital instruction includes an actual control signal that directly modified a condition to mitigate or stop the damage as described herein. In some embodiments, the digital instruction is a notification to a user device specifying what steps a user must take to modify or mitigate damage. In embodiments, such digital instructions are based upon a determination that one or more parcels have been damaged in a particular way by traversing through the parcel interaction point(s) and that the digital instructions may lead to fewer damaged parcels or the elimination of damage to parcels traversing through the parcel interaction point(s).

The term "parcel view overlap" refers to any overlap or duplication of a portion of digital images representing a parcel. For example, a side view of a parcel and a frontal view of a parcel, while technically representing two fields of view, may have overlapping segments of the parcel.

The term "transit network interaction point identifier" refers to a digital identifier associated with a physical interaction point (e.g., geo-coordinates) within a transit network.

The term "parcel identifier" refers to a digital identifier associated with a parcel that is traversing a transit network. Accordingly, a parcel identifier can identify a particular parcel.

The term "parcel damage analysis summary" refers to one or more items of data, such as digital data included in a data structure, and which is associated with an analysis of damage associated with a parcel traversing a transit network. For example, after damage is associated with a parcel, the parcel damage analysis summary can include a parcel type of the damaged parcel, a damage type associated with the parcel, a parcel damage location identifier associated with the damaged parcel, a parcel damage severity associated with the parcel, a parcel damage mitigation recommendation associated with the parcel, and a parcel damage restoration estimate associated with the parcel.

The term "parcel type" refers to a digital representation of a classification or categorization of a parcel. For example, a parcel may be classified as an envelope, a small box, a large box, a vehicle, and the like. In various embodiments, some or each of the parcel type is an output (e.g., a fully connected layer output in a neural network) for classifying the parcel type in one or more machine learning models.

The term "parcel damage type" refers to a digital representation of a classification of a type of damage caused to a parcel. For example, damage to a parcel may be classified as water damage, extreme temperature exposure, constitutional (exterior or interior) damage resulting from unsustainable squeezing or other crushing of the parcel, belt burn (i.e., damage resulting from a conveyor belt as described herein), drop induced damage (i.e., the parcel was dropped on the floor or flooring), shredding, and the like. In various embodiments, some or each of the parcel damage types are an output for classifying the damage type in one or more machine learning models.

The term "parcel damage location identifier" refers to a digital identifier associated with a location (e.g., geo-coordinates) within a transit network that is known to be associated with damage to a particular parcel. For example, any location where the parcel damage began or first identified can correspond to the parcel damage location identifier. Alternatively or additionally, any location where the parcel continues to be damaged or incurs more damage can correspond to the parcel damage location identifier.

The term "parcel damage severity" refers to a characterization of a level of severity associated with damage caused to a parcel. The parcel damage severity can include cardinality level categorizations, such as "not severe," "moderately sever," and/or severe, and/or include continuous non-categorical level severity, such as integers that are directly proportional to the severity (e.g., on a scale of 1 through 10, 1 is not damaged at all and 10 is the most damaged a parcel can get). In some embodiments, parcel damage severity is based on pixel variations between images as analyzed by one or more machine learning models, as described in more detail below.

The term "parcel damage mitigation recommendation" refers to one or more potential mitigation techniques that, if employed, may prevent or help prevent a particular type of parcel damage known to be caused at a particular parcel interaction point within a parcel transit network.

The term "parcel damage restoration estimate" refers to a digital representation of a monetary, time-based, or other factor estimate associated with restoring or replacing known damaged parcels. For example, the parcel damage restoration estimate can include a cost, in terms of time and/or money that a specific damage to a parcel will take to restore the damaged parcel back to a non-damaged state.

III. Exemplary System Architecture

FIG. 1 provides an illustration of an exemplary embodiment of the present disclosure. As shown in FIG. 1, this particular embodiment may include one or more manual delivery vehicles 100, one or more analysis computing entities 105, one or more mobile computing entities 110, one or more satellites 112, one or more autonomous vehicles 140, one or more networks 135, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Analysis Computing Entities

FIG. 2 provides a schematic of an analysis computing entity 105 according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the analysis computing entity 105 may also include one or more communications interfaces 220 for communicating with various computing entities, such as by communicating data, content, information/data, and/or similar terms used herein interchangeably that can be transmitted, received, operated on, processed, displayed, stored, and/or the like.

As shown in FIG. 2, in particular embodiments, the analysis computing entity 105 may include or be in communication with one or more processing elements 205 (also referred to as processors, processing circuitry, and/or similar terms used herein interchangeably) that communicate with other elements within the analysis computing entity 105 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In particular embodiments, the analysis computing entity 105 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity—relationship model, object model, document model, semantic model, graph model, and/or the like.

In particular embodiments, the analysis computing entity 105 may further include or be in communication with volatile media (also referred to as volatile storage, memory, memory storage, memory circuitry and/or similar terms used herein interchangeably). In particular embodiments, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 105 with the assistance of the processing element 205 and operating system.

As indicated, in particular embodiments, the analysis computing entity 105 may also include one or more communications interfaces 220 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the analysis computing entity 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowB and IoT (NB IoT), and/or any other wireless protocol.

Although not shown, the analysis computing entity 105 may include or be in communication with one or more input elements, such as a keyboard input, a mouse input, a touch screen/display input, motion input, movement input, audio input, pointing device input, joystick input, keypad input, and/or the like. The analysis computing entity 105 may also include or be in communication with one or more output elements (not shown), such as audio output, video output, screen/display output, motion output, movement output, and/or the like.

As will be appreciated, one or more of the analysis computing entity's 100 components may be located remotely from other analysis computing entity 105 components, such as in a distributed system. Furthermore, one or more of the components may be combined and additional components performing functions described herein may be included in the analysis computing entity 105. Thus, the analysis computing entity 105 can be adapted to accommodate a variety of needs and circumstances. As will be recognized, these architectures and descriptions are provided for exemplary purposes only and are not limiting to the various embodiments.

2. Exemplary Mobile Computing Entities

Mobile computing entities 110 may be configured for autonomous operation (e.g., in association with an autonomous vehicle 140) and/or for operation by a user (e.g., a vehicle operator, delivery personnel, customer, and/or the like). In certain embodiments, mobile computing entities 110 may be embodied as handheld computing entities, such as mobile phones, tablets, personal digital assistants, and/or the like, that may be operated at least in part based on user input received from a user via an input mechanism. Moreover, mobile computing entities 110 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, mobile computing entities 110 may be utilized as onboard controllers for UAVs configured for picking-up and/or delivering packages to various locations, and accordingly such mobile computing entities 110 may be configured to monitor various inputs (e.g., from various sensors) and generated various outputs (e.g., control instructions received by various vehicle drive mechanisms). It should be understood that various embodiments of the present disclosure may comprise a plurality of mobile computing entities 110 embodied in one or more forms (e.g., handheld mobile computing entities 110, vehicle-mounted mobile computing entities 110, and/or autonomous mobile computing entities 110).

As will be recognized, a user may be an individual, a family, a company, an organization, an entity, a department within an organization, a representative of an organization and/or person, and/or the like—whether or not associated with a carrier. In particular embodiments, a user may operate a mobile computing entity 110 that may include one or more components that are functionally similar to those of the analysis computing entity 105. FIG. 3 provides an illustrative schematic representative of a mobile computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Mobile computing entities 110 can be operated by various parties, including carrier personnel (sorters, loaders, delivery drivers, network administrators, and/or the like). As shown in FIG. 3, the mobile computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the mobile computing entity 110 may be capable of operating with one or more air interface standards, communication protocols, modulation types, and access types. More particularly, the mobile computing entity 110 may operate in accordance with any of a number of wireless communication standards and protocols, such as those described above with regard to the analysis computing entity 105. In a particular embodiment, the mobile computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile computing entity 110 may operate in accordance with multiple wired communication standards and protocols, such as those described above with regard to the analysis computing entity 105 via a network interface 320.

Via these communication standards and protocols, the mobile computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entity 110 can also download changes, add-ons, and updates, for instance, to its firmware, software (e.g., including executable instructions, applications, program modules), and operating system.

According to particular embodiments, the mobile computing entity 110 may include location determining aspects, devices, modules, functionalities, and/or similar words used herein interchangeably. For example, the mobile computing entity 110 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the mobile computing entity's 110 position in connection with a variety of other systems, including cellular towers, Wi-Fi access points, and/or the like. Similarly, the mobile computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The mobile computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the mobile computing entity 110 to interact with and/or cause display of information from the analysis computing entity 105, as described herein. The user input interface can comprise any of a number of devices or interfaces allowing the mobile computing entity 110 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mobile computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 3, the mobile computing entity 110 may also include an camera, imaging device, and/or similar words used herein interchangeably 326 (e.g., still-image camera, video camera, IoT enabled camera, IoT module with a low resolution camera, a wireless enabled MCU, and/or the like) configured to capture images. The mobile computing entity 110 may be configured to capture images via the onboard camera 326, and to store those imaging devices/cameras locally, such as in the volatile memory 322 and/or non-volatile memory 324. As discussed herein, the mobile computing entity 110 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 326. The contextual data may be stored as a portion of the image (such that a visual representation of the image data includes the contextual data) and/or may be stored as metadata associated with the image data that may be accessible to various computing entities 110.

The mobile computing entity 110 may include other input mechanisms, such as scanners (e.g., barcode scanners), microphones, accelerometers, RFID readers, and/or the like configured to capture and store various information types for the mobile computing entity 110. For example, a scanner may be used to capture parcel/item/shipment information/data from an item indicator disposed on a surface of a shipment or other item. In certain embodiments, the mobile computing entity 110 may be configured to associate any captured input information/data, for example, via the onboard processing element 308. For example, scan data captured via a scanner may be associated with image data captured via the camera 326 such that the scan data is provided as contextual data associated with the image data.

The mobile computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the mobile computing entity 110. As indicated, this may include a user application that is resident on the entity or accessible through a browser or other user interface for communicating with the analysis computing entity 105 and/or various other computing entities.

In another embodiment, the mobile computing entity 110 may include one or more components or functionality that are the same or similar to those of the analysis computing entity 105, as described in greater detail above. As will be recognized, these architectures and descriptions are provided for exemplary purposes only and are not limiting to the various embodiments.

3. Exemplary Autonomous Vehicle

As utilized herein, autonomous vehicles 140 may be configured for transporting one or more shipments/items (e.g., one or more packages, parcels, bags, containers, loads, crates, items banded together, vehicle parts, pallets, drums, the like, and/or similar words used herein interchangeably). Various autonomous vehicles 140 may be configured as discussed in co-pending U.S. patent application Ser. No. 15/582,129, filed Apr. 28, 2017, and incorporated herein by reference in its entirety.

In certain embodiments, each autonomous vehicle 140 may be associated with a unique vehicle identifier (such as a vehicle ID) that uniquely identifies the autonomous vehicle 140. The unique vehicle ID may include characters, such as numbers, letters, symbols, and/or the like. For example, an alphanumeric vehicle ID (e.g., "AS445") may be associated with each vehicle 140. Although the autonomous vehicles 140 are discussed herein as comprising unmanned aerial vehicles (UAVs), it should be understood that the autonomous vehicles may comprise ground-based autonomous vehicles 140 in certain embodiments.

FIG. 4 illustrates an example autonomous vehicle 140 that may be utilized in various embodiments. As shown in FIG. 4, the autonomous vehicle 140 is embodied as a UAV generally comprising a UAV chassis 142 and a plurality of propulsion members 143 extending outwardly from the UAV chassis 142 (in certain embodiments, the propulsion members are surrounded by propeller guards 141). The UAV chassis 142 generally defines a body of the UAV, which the propulsion members 143 (e.g., propellers having a plurality of blades configured for rotating within a propeller guard circumscribing the propellers) are configured to lift and guide during flight. According to various embodiments, the UAV chassis 142 may be formed from any material of suitable strength and weight (including sustainable and reusable materials), including but not limited to composite materials, aluminum, titanium, polymers, and/or the like, and can be formed through any suitable process.

In the embodiment depicted in FIG. 4, the autonomous vehicle 140 is a hexacopter and includes six separate propulsion members 143, each extending outwardly from the UAV chassis 142. However, as will be appreciated from the description herein, the autonomous vehicle 140 may include any number of propulsion members 143 suitable to provide lift and guide the autonomous vehicle 140 during flight. The propulsion members 143 are configured to enable vertical locomotion (e.g., lift) and/or horizontal locomotion, as shown in the example embodiment of FIG. 4, as well as enabling roll, pitch, and yaw movements of the autonomous vehicle 140. Although not shown, it should be understood that autonomous vehicles 140 may comprise any of a variety of propulsion mechanisms, such as balloon-based lift mechanisms (e.g., enabling lighter-than-air transportation), wing-based lift mechanisms, turbine-based lift mechanisms, and/or the like.

In the illustrated embodiment, the propulsion members 143 are electrically powered (e.g., by an electric motor that controls the speed at which the propellers rotate). However, as will be recognized, the propulsion members 143 may be powered by internal combustion engines (e.g., alcohol-fueled, oil-fueled, gasoline-fueled, and/or the like) driving an alternator, hydrogen fuel-cells, and/or the like.

Moreover, as shown in FIG. 4, the lower portion of the UAV chassis 142 is configured to receive and engage a parcel carrier 144 configured for selectively supporting a parcel/item/shipment to be delivered from a manual delivery vehicle 100 to a delivery destination. The parcel carrier 144 may define the lowest point of the autonomous vehicle 140 when secured relative to the chassis 142 of the autonomous vehicle 140, such that a parcel/item/shipment carried by the autonomous vehicle 140 may be positioned below the chassis of the autonomous vehicle 140 during transit. In certain embodiments, the parcel carrier 144 may comprise one or more parcel engagement arms 145 configured to detachably secure a parcel/item/shipment relative to the autonomous vehicle 140. In such embodiments, the parcel/item/shipment may be suspended by the parcel engagement arms 145 below the autonomous vehicle 140, such that it may be released from the autonomous vehicle 140 while the autonomous vehicle 140 hovers over a desired delivery destination. However, it should be understood that the parcel carrier 144 may have any of a variety of configurations enabling the autonomous vehicle 140 to support a parcel/item/shipment during transit. For example, the parcel carrier 144 may comprise a parcel cage for enclosing a parcel/item/shipment during transit, a parcel platform positioned above the UAV chassis 142, and/or the like.

In certain embodiments, the parcel carrier 144 may be detachably secured relative to the UAV chassis 142, for example, such that alternative parcel carriers 144 having shipments/items secured thereto may be alternatively connected relative to the UAV chassis 142 for delivery. In certain embodiments, a UAV may be configured to deliver a parcel/item/shipment secured within a parcel carrier 144, and return to a manual delivery vehicle 100 where the now-empty parcel carrier 144 (due to the delivery of the parcel/item/shipment that was previously secured therein) may be detached from the autonomous vehicle 140 and a new parcel carrier 144 having a second parcel/item/shipment may secured to the UAV chassis 142.

As indicated by FIG. 5, which illustrates an example manual delivery vehicle 100 according to various embodiments, the autonomous vehicle 140 may be configured to selectively engage a portion of the manual delivery vehicle 100 such that the manual delivery vehicle 100 may transport the autonomous vehicle 140 and/or other similar autonomous vehicles. For example, the UAV chassis 142 may be configured to engage one or more vehicle guide mechanisms secured relative to the manual delivery vehicle 100 to detachably secure the autonomous vehicle 140 relative to the manual delivery vehicle 100 when not delivering shipments/items. As discussed herein, the guide mechanism of a manual delivery vehicle 100 may be configured to enable an autonomous vehicle 140 to autonomously take-off or depart from the manual delivery vehicle 100 to initiate a delivery activity and/or to autonomously land or arrive at the manual delivery vehicle 100 to conclude a delivery activity.

Moreover, the autonomous vehicle 140 additionally comprises an onboard control system embodied as a mobile computing entity 110 that includes a plurality of sensing devices that assist in navigating autonomous vehicle 140 during flight. For example, the control system is configured to control movement of the vehicle 140, navigation of the vehicle 140, obstacle avoidance, item delivery, and/or the like. Although not shown, the control system may additionally comprise one or more user interfaces, which may comprise an output mechanism and/or an input mechanism configured to receive user input. For example, the user interface may be configured to enable autonomous vehicle technicians to review diagnostic information/data relating to the autonomous vehicle 140, and/or a user of the autonomous vehicle 140 may utilize the user interface to input and/or review information/data indicative of a destination location for the autonomous vehicle 140.

The plurality of sensing devices are configured to detect objects around the autonomous vehicle 140 and provide feedback to an autonomous vehicle onboard control system to assist in guiding the autonomous vehicle 140 in the execution of various operations, such as takeoff, flight navigation, and landing, as will be described in greater detail herein. In certain embodiments, the autonomous vehicle control system comprises a plurality of sensors including ground landing sensors, vehicle landing sensors, flight guidance sensors, and one or more imaging devices/cameras (e.g., that utilize object recognition algorithms to identify objects). The vehicle landing sensors may be positioned on a lower portion of the UAV chassis 142 and assist in landing the autonomous vehicle 140 on a manual delivery vehicle 100 (e.g., as shown in FIG. 5) as will be described in greater detail herein. The vehicle landing sensors may include one or more imaging devices/cameras (e.g., video imaging devices/cameras and/or still imaging devices/cameras), one or more altitude sensors (e.g., Light Detection and Ranging (LIDAR) sensors, laser-based distance sensors, infrared distance sensors, ultrasonic distance sensors, optical sensors and/or the like). Being located on the lower portion of the UAV chassis 142, the vehicle landing sensors are positioned below the propulsion members 143 and have a line of sight with the manual delivery vehicle's UAV support mechanism (FIG. 5) when the autonomous vehicle 140 approaches the manual delivery vehicle 100 during landing.

The autonomous vehicle's one or more imaging devices/cameras may also be positioned on the lower portion of the UAV chassis 142, on propeller guards 141, and/or the like. The one or more imaging devices/cameras may include video and/or still imaging devices/cameras, and may capture images and/or video of the flight of the autonomous vehicle 140 during a delivery process, and may assist in verifying or confirming delivery of a parcel/item/shipment to a destination, as will be described in greater detail herein. Being located on the lower portion of the UAV chassis 142, the one or more imaging devices/cameras are positioned below the propulsion members 143 and have an unobstructed line of sight to view the flight of the autonomous vehicle 140. Moreover, as discussed specifically in reference to the various mobile computing entities 110, the one or more imaging devices/cameras disposed on the UAV may be configured for capturing images of one or more items/shipments before picking-up those items/shipments, after dropping off those items/shipments, during transit of the items/shipments, and/or the like.

In various embodiments, the control system of the autonomous vehicle 140 may encompass, for example, an information/data collection device similar to information/data collection device 130 discussed in reference to a manual delivery vehicle 100 or other computing entities.

In particular embodiments, the information/data collection device 130 may include, be associated with, or be in wired or wireless communication with one or more processors (various exemplary processors are described in greater detail below), one or more location-determining devices or one or more location sensors (e.g., Global Navigation Satellite System (GNSS) sensors, indoor location sensors, (e.g., Bluetooth sensors, Wi-Fi sensors, GPS sensors, beacon sensors, and/or the like), one or more real-time clocks, a J-Bus protocol architecture, one or more electronic control modules (ECM), one or more communication ports for receiving information/data from various sensors (e.g., via a CAN-bus), one or more communication ports for transmitting/sending information/data, one or more RFID tags/sensors, one or more power sources, one or more information/data radios for communication with a variety of communication networks, one or more memory modules, and one or more programmable logic controllers (PLC). It should be noted that many of these components may be located in the autonomous vehicle 140 but external to the information/data collection device 130.

In some embodiments, the one or more location sensors, modules, or similar words used herein interchangeably may be one of several components in wired or wireless communication with or available to the information/data collection device 130. Moreover, the one or more location sensors may be compatible with GPS satellites 112, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like.

As discussed herein, triangulation and/or proximity based location determinations may be used in connection with a device associated with a particular autonomous vehicle 140 and with various communication points (e.g., cellular towers, Wi-Fi access points, and/or the like) positioned at various locations throughout a geographic area to monitor the location of the vehicle 100 and/or its operator. The one or more location sensors may be used to receive latitude, longitude, altitude, heading or direction, geocode, course, position, time, location identifying information/data, and/or speed information/data (e.g., referred to herein as location information/data and further described herein below). The one or more location sensors may also communicate with the analysis computing entity 105, the information/data collection device 130, mobile computing entity 110, and/or similar computing entities.

In some embodiments, the ECM may be one of several components in communication with and/or available to the information/data collection device 130. The ECM, which may be a scalable and subservient device to the information/data collection device 130, may have information/data processing capability to decode and store analog and digital inputs received from, for example, vehicle systems and sensors. The ECM may further have information/data processing capability to collect and present location information/data to the J-Bus (which may allow transmission to the information/data collection device 130), and output location identifying information/data, for example, via a display and/or other output device (e.g., a speaker).

As indicated, a communication port may be one of several components available in the information/data collection device 130 (or be in or as a separate computing entity). Embodiments of the communication port may include an Infrared information/data Association (IrDA) communication port, an information/data radio, and/or a serial port. The communication port may receive instructions for the information/data collection device 130. These instructions may be specific to the vehicle 100 in which the information/data collection device 130 is installed, specific to the geographic area and/or serviceable point to which the vehicle 100 will be traveling, specific to the function the vehicle serves within a fleet, and/or the like. In particular embodiments, the information/data radio may be configured to communicate with a WWAN, WLAN, WPAN, or any combination thereof. For example, the information/data radio may communicate via various wireless protocols, such as 802.11, GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols (including BLE), wireless USB protocols, and/or any other wireless protocol. As yet other examples, the communication port may be configured to transmit and/or receive information/data transmissions via light-based communication protocols (e.g., utilizing specific light emission frequencies, wavelengths (e.g., visible light, infrared light, and/or the like), and/or the like to transmit data), via sound-based communication protocols (e.g., utilizing specific sound frequencies to transmit data), and/or the like.

4. Exemplary Manual Delivery Vehicle

As discussed herein, a manual delivery vehicle 100 may be a user (e.g., human) operable delivery vehicle configured for transporting a vehicle operator, a plurality of items, and one or more autonomous vehicles 140 along a delivery route. However, it should be understood that in certain embodiments, even though the term manual delivery vehicle 100 is used, this is simply to distinguish it in the description from the autonomous vehicle 140. Thus, the manual delivery vehicle 100 may itself be autonomous or semi-autonomous. For example, the manual delivery vehicle 100 is a self-driving vehicle in some embodiments such that no physical person or user is needed to operate the vehicle 100. In certain embodiments, an autonomous manual delivery vehicle 100 may be configured as an autonomous base vehicle configured to carry a plurality of items, one or more smaller, auxiliary autonomous vehicles (e.g., autonomous vehicles 140 described in detail herein), a human delivery personnel (e.g., who may complete various deliveries from the manual delivery vehicle 100 to respective destination locations), and/or the like. For example, a vehicle 100 may be a manned or an unmanned tractor, truck, car, motorcycle, moped, Segway, bicycle, golf cart, hand truck, cart, trailer, tractor and trailer combination, van, flatbed truck, vehicle, drone, airplane, helicopter, boat, barge, and/or any other form of object for moving or transporting people, UAVs, and/or shipments/items (e.g., one or more packages, parcels, bags, containers, loads, crates, items banded together, vehicle parts, pallets, drums, the like, and/or similar words used herein interchangeably). In particular embodiments, each vehicle 100 may be associated with a unique vehicle identifier (such as a vehicle ID) that uniquely identifies the vehicle 100. The unique vehicle ID (e.g., trailer ID, tractor ID, vehicle ID, and/or the like) may include characters, such as numbers, letters, symbols, and/or the like. For example, an alphanumeric vehicle ID (e.g., "AS445") may be associated with each vehicle 100. In another embodiment, the unique vehicle ID may be the license plate, registration number, or other identifying information/data assigned to the vehicle 100. In various embodiments, the manual delivery vehicle 100 may be configured as discussed in co-pending U.S. patent application Ser. No. 15/582,129, filed Apr. 28, 2017, and incorporated herein by reference in its entirety.

In various embodiments, the manual delivery vehicle 100 comprises one or more autonomous vehicle support mechanisms, as shown in FIG. 5. The autonomous vehicle support mechanisms may be configured to enable the autonomous vehicles 140 to launch and land at the manual delivery vehicle 100 while completing autonomous deliveries. In certain embodiments, the autonomous vehicle support mechanisms may be configured to enable the autonomous vehicles 140 to launch and/or land while the manual delivery vehicle 100 is moving, however certain embodiments may be configured to enable autonomous vehicle 140 launching and/or landing while the manual delivery vehicle 100 is stationary.

Moreover, although not shown, the interior of the manual delivery vehicle 100 may comprise a cargo area configured for storing a plurality of items, a plurality of autonomous vehicles 140, a plurality of autonomous vehicle components, and/or the like. In certain embodiments, items designated for autonomous delivery may be stored in one or more autonomously operated storage assemblies within the cargo area of the manual delivery vehicle 100. When a particular parcel/item/shipment is identified as ready for delivery, the storage assembly autonomously delivers the parcel/item/shipment to an autonomous vehicle 140 for delivery.

Moreover, the manual delivery vehicle 100 may comprise and/or be associated with one or more mobile computing entities 110, devices, and/or similar words used herein interchangeably. The mobile computing entities 110 may comprise, for example, an information/data collection device 130 or other computing entities.

In particular embodiments, the information/data collection device 130 may include, be associated with, or be in wired or wireless communication with one or more processors (various exemplary processors are described in greater detail below), one or more location-determining devices or one or more location sensors (e.g., GNSS sensors), one or more telematics sensors, one or more real-time clocks, a J-Bus protocol architecture, one or more ECMs, one or more communication ports for receiving telematics information/data from various sensors (e.g., via a CAN-bus), one or more communication ports for transmitting/sending information/data, one or more RFID tags/sensors, one or more power sources, one or more information/data radios for communication with a variety of communication networks, one or more memory modules, and one or more programmable logic controllers (PLC). It should be noted that many of these components may be located in the vehicle 100 but external to the information/data collection device 130.

In particular embodiments, the one or more location sensors, modules, or similar words used herein interchangeably may be one of several components in wired or wireless communication with or available to the information/data collection device 130. Moreover, the one or more location sensors may be compatible with GPS satellites 112, LEO satellite systems, DOD satellite systems, the European Union Galileo positioning systems, the Chinese Compass navigation systems, Indian Regional Navigational satellite systems, and/or the like, as discussed above in reference to the autonomous delivery vehicle. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 100 and/or its operator. The one or more location sensors may be used to receive latitude, longitude, altitude, heading or direction, geocode, course, position, time, and/or speed information/data (e.g., referred to herein as telematics information/data and further described herein below). The one or more location sensors may also communicate with the analysis computing entity 105, the information/data collection device 130, mobile computing entity 110, and/or similar computing entities.

In particular embodiments, the ECM may be one of several components in communication with and/or available to the information/data collection device 130. The ECM, which may be a scalable and subservient device to the information/data collection device 130, may have information/data processing capability to decode and store analog and digital inputs from vehicle systems and sensors (e.g., location sensor). The ECM may further have information/data processing capability to collect and present collected information/data to the J-Bus (which may allow transmission to the information/data collection device 130).

As indicated, a communication port may be one of several components available in the information/data collection device 130 (or be in or as a separate computing entity). Embodiments of the communication port may include an IrDA communication port, an information/data radio, and/or a serial port. The communication port may receive instructions for the information/data collection device 130. These instructions may be specific to the vehicle 100 in which the information/data collection device 130 is installed, specific to the geographic area in which the vehicle 100 will be traveling, specific to the function the vehicle 100 serves within a fleet, and/or the like. In particular embodiments, the information/data radio may be configured to communicate with WWAN, WLAN, WPAN, or any combination thereof, as discussed in reference to the autonomous vehicle, above.

5. Exemplary Parcel/Item/Shipment

In particular embodiments, each parcel/item/shipment may include and/or be associated with a parcel/item/shipment identifier, such as an alphanumeric identifier. Such parcel/item/shipment identifiers may be represented as text, barcodes, tags, character strings, Aztec Codes, MaxiCodes, information/data Matrices, Quick Response (QR) Codes, electronic representations, and/or the like. A unique parcel/item/shipment identifier (e.g., 123456789) may be used by the carrier to identify and track the parcel/item/shipment as it moves through the carrier's transportation network and to associate a particular physical parcel/item/shipment with an electronically stored parcel/item/shipment profile. For example, the parcel/item/shipment profile may be stored in a parcel/item/shipment level detail database, and may store data informing various carrier personnel and/or delivery vehicles (e.g., autonomous vehicle 140) of delivery-related information/data specific to a particular shipment. Further, such parcel/item/shipment identifiers can be affixed to shipments/items by, for example, using a sticker (e.g., label) with the unique parcel/item/shipment identifier printed thereon (in human and/or machine readable form) or an RFID tag with the unique parcel/item/shipment identifier stored therein. Such items may be referred to as "connected" shipments/items and/or "non-connected" shipments/items.

In particular embodiments, connected shipments/items include the ability to determine their locations and/or communicate with various computing entities. This may include the parcel/item/shipment being able to communicate via a chip or other devices, such as an integrated circuit chip, RFID technology, NFC technology, Bluetooth technology, Wi-Fi technology, light-based communication protocols, sound-based communication protocols, and any other suitable communication techniques, standards, or protocols with one another and/or communicate with various computing entities for a variety of purposes. Connected shipments/items may include one or more components that are functionally similar to those of the analysis computing entity 105 and/or mobile computing entity 110 as described herein. For example, in particular embodiments, each connected parcel/item/shipment may include one or more processing elements, one or more display device/input devices (e.g., including user interfaces), volatile and non-volatile storage or memory, and/or one or more communications interfaces. In this regard, in some example embodiments, a parcel/item/shipment may communicate send "to" address information/data, received "from" address information/data, unique identifier codes, location information/data, status information/data, and/or various other information/data.

In particular embodiments, non-connected shipments/items do not typically include the ability to determine their locations and/or might not be able communicate with various computing entities or are not designated to do so by the carrier. The location of non-connected shipments/items can be determined with the aid of other appropriate computing entities. For example, non-connected shipments/items can be scanned (e.g., affixed barcodes, RFID tags, and/or the like) or have the containers or vehicles in which they are located scanned or located. As will be recognized, an actual scan or location determination of a parcel/item/shipment is not necessarily required to determine the location of a parcel/item/shipment. That is, a scanning operation might not actually be performed on a label affixed directly to a parcel/item/shipment or location determination might not be made specifically for or by a parcel/item/shipment. For example, a label on a larger container housing many shipments/items can be scanned, and by association, the location of the shipments/items housed within the container are considered to be located in the container at the scanned location. Similarly, the location of a vehicle transporting many shipments/items can be determined, and by association, the location of the shipments/items being transported by the vehicle are considered to be located in the vehicle 100 at the determined location. These can be referred to as "logical" scans/determinations or "virtual" scans/determinations. Thus, the location of the shipments/items is based on the assumption they are within the container or vehicle, despite the fact that one or more of such shipments/items might not actually be there.

6. Exemplary Parcel/Item/Shipment Profile

As noted herein, various shipments/items may have an associated parcel/item/shipment profile, record, and/or similar words used herein interchangeably stored in a parcel/item/shipment detail database. The parcel/item/shipment profile may be utilized by the carrier to track the current location of the parcel/item/shipment and to store and retrieve information/data about the parcel/item/shipment. For example, the parcel/item/shipment profile may comprise electronic data corresponding to the associated parcel/item/shipment, and may identify various shipping instructions for the parcel/item/shipment, various characteristics of the parcel/item/shipment, and/or the like. The electronic data may be in a format readable by various computing entities, such as an analysis computing entity 105, a mobile computing entity 110, an autonomous vehicle control system, and/or the like. However, it should be understood that a computing entity configured for selectively retrieving electronic data within various parcel/item/shipment profiles may comprise a format conversion aspect configured to reformat requested data to be readable by a requesting computing entity.

In various embodiments, the parcel/item/shipment profile comprises identifying information/data corresponding to the parcel/item/shipment. The identifying information/data may comprise information/data identifying the unique parcel/item/shipment identifier associated with the parcel/item/shipment. Accordingly, upon providing the identifying information/data to the parcel/item/shipment detail database, the parcel/item/shipment detail database or other data store may query the stored parcel/item/shipment profiles to retrieve the parcel/item/shipment profile corresponding to the provided unique identifier.

Moreover, the parcel/item/shipment profiles may comprise shipping information/data for the parcel/item/shipment. For example, the shipping information/data may identify an origin location (e.g., an origin serviceable point), a destination location (e.g., a destination serviceable point), a service level (e.g., Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, High value CHC (critical health care) shipments, and/or the like), whether a delivery confirmation signature is required, and/or the like. In certain embodiments, at least a portion of the shipping information/data may be utilized as identifying information/data to identify a parcel/item/shipment. For example, a destination location may be utilized to query the parcel/item/shipment detail database to retrieve data about the parcel/item/shipment.

In certain embodiments, the parcel/item/shipment profile comprises characteristic information/data identifying parcel/item/shipment characteristics. For example, the characteristic information/data may identify dimensions of the parcel/item/shipment (e.g., length, width, height), a weight of the parcel/item/shipment, contents of the parcel/item/shipment, and/or the like. In certain embodiments, the contents of the parcel/item/shipment may comprise a precise listing of the contents of the parcel/item/shipment (e.g., three widgets) and/or the contents may identify whether the parcel/item/shipment contains any hazardous materials (e.g., the contents may indicate whether the parcel/item/shipment contains one or more of the following: no hazardous materials, toxic materials, flammable materials, pressurized materials, controlled substances, firearms, and/or the like).

7. Exemplary Conveying Mechanism

As shipments/items are moved through a carrier's logistics network between corresponding origins and destinations, those shipments/items may pass through one or more carrier sort locations. Each carrier sort location may comprise one or more conveying mechanisms (e.g., conveyor belts, chutes, and/or the like, configured to move shipments/items between incoming locations (e.g., incoming vehicles) to corresponding outbound vehicles destined for later locations along a parcel/item/shipment's intended transportation path between the origin and destination.

FIG. 6 includes an illustration of a conveying mechanism 115 according to particular embodiments of the present disclosure. As shown in FIGS. 6A and 6B, the conveying mechanism 115 may comprise a multi-view image capture system=(comprising one or more image/acquisition devices 401 and/or similar words used herein interchangeably) for acquiring information/data (including image information/data) from a parcel/item/shipment. As mentioned herein, each parcel/item/shipment may include a parcel/item/shipment identifier, such as an alphanumeric identifier. Such parcel/item/shipment identifiers may be represented as text, barcodes, Aztec Codes, MaxiCodes, Data Matrices, Quick Response (QR) Codes, electronic representations, tags, character strings, and/or the like. The unique parcel/item/shipment identifier (e.g., 123456789) may be used by the carrier to identify and track the parcel/item/shipment as it moves through the carrier's transportation network. Further, such parcel/item/shipment identifiers can be affixed to items by, for example, using a sticker (e.g., label) with the unique parcel/item/shipment identifier printed thereon (in human and/or machine readable form) or an RFID tag with the unique parcel/item/shipment identifier stored therein. Accordingly, the one or more image/acquisition devices 401 may be capable of acquiring data (including parcel/item/shipment identifiers) relevant to each parcel/item/shipment, including parcel/item/shipment identifier information/data, parcel/item/shipment condition information/data, and/or the like for shipments/items traveling along a corresponding conveying mechanism 115 (e.g., conveyor belt, slide, chute, bottle conveyor, open or enclosed track conveyor, I-beam conveyor, cleated conveyor, and/or the like).

As indicated, the image/acquisition devices 401 may be part of a multi-view image capture system 400 configured to capture images (e.g., image information/data) of shipments/items (and/or parcel/item/shipment identifiers) moving along the conveying mechanism 115. For example, the image/acquisition device 401 may include or be a video camera, camcorder, still camera, web camera, Single-Lens Reflex (SLR) camera, high-speed camera, and/or the like. In various embodiments, the image/acquisition device 401 may be configured to record high-resolution image data and/or to capture image data at a high speed (e.g., utilizing a frame rate of at least 60 frames per second). Alternatively, the image/acquisition device 401 may be configured to record low-resolution image data (e.g., images comprising less than 480 horizontal scan lines) and/or to capture image data at a low speed (e.g., utilizing a frame rate less than 60 frames per second). As will be understood by those skilled in the art, the image/acquisition device 401 may be configured to operate with various combinations of the above features (e.g., capturing images with less than 480 horizontal scan lines and utilizing a frame rate of at least 60 frames per second, or capturing images with at least 480 horizontal scan lines and utilizing a frame rate less than 60 frames per second). In various embodiments, the image/acquisition device 401 may be configured to capture image data of the shipments/items and conveying mechanism 115 of sufficient quality that a user viewing the image data on the display can identify each parcel/item/shipment represented in the displayed image data. For example, in embodiments wherein the conveying mechanism 115 and shipments/items are moving at a high rate of speed, the image/acquisition device 401 may be configured to capture image data at a high speed. As will be recognized, the image data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, VP8, and/or the like. In certain embodiments, various features (e.g., text, objects of interest, codes, parcel/item/shipment identifiers, and/or the like) can be extracted from the image data.

As described in more detail with respect to FIG. 7 herein, in some embodiments, the image capture system 400 may alternatively or identical image capture systems may additionally be located within various other points or areas within a parcel carrier's logistic network other than the environment associated with FIG. 6A.

The image/acquisition device 401 may additionally include or be one or more scanners, readers, interrogators, and similar words used herein interchangeably configured for capturing parcel/item/shipment indicia for each parcel/item/shipment (e.g., including parcel/item/shipment identifiers). For example, the scanners may include a barcode scanner, an RFID reader, and/or the like configured to recognize and identify parcel/item/shipment identifiers associated with each parcel/item/shipment. In particular embodiments, the image/acquisition device 401 may be capable of receiving visible light, infrared light, radio transmissions, and/or other transmissions capable of transmitting information to the image/acquisition device 401. Similarly, the image/acquisition device 401 may include or be used in association with various lighting, such as light emitting diodes (LEDs), Infrared lights, array lights, strobe lights, and/or other lighting mechanisms to sufficiently illuminate the zones of interest to capture image data for analysis.

Similar to mobile computing entities 110 described above, in particular embodiments, the conveying mechanism 115, multi-view image capture system 400, and/or image/acquisition devices 401 may also include one or more communications interfaces for communicating with various computing entities, such as by communicating information/data, content, information/data, and/or similar terms used herein interchangeably that can be transmitted, received, operated on, processed, displayed, stored, and/or the like. Such communication may be executed using a wired data transmission protocol, such as FDDI, DSL, Ethernet, ATM, frame relay, DOCSIS, or any other wired transmission protocol. Similarly, the conveying mechanism 115 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, NFC protocols, Bluetooth™ protocols, wireless USB protocols, long range low power (LoRa), LTE Cat M1, NarrowBand IoT (NB IoT), and/or any other wireless protocol.

As will be understood by those skilled in the art, the multi-view image capture system 400 may include more than one image/acquisition device 401 (see FIG. 6B). In various embodiments, one or more additional image/acquisition devices may be used to capture additional image data at one or more additional locations along the conveying mechanism 115 or an additional conveying mechanism. Such additional image/acquisition devices 401 may be located, for example, after the flow of items along the conveying mechanism 115 is disturbed (e.g., the flow of shipments/items is culled, merged with an additional flow of shipments/items, or diverted to an additional conveying mechanism). Alternatively, one or more additional image/acquisition devices may be located along the conveying mechanism 115, such that the one or more additional image/acquisition devices may capture updated image data after one or more of the shipments/items may have been removed from the conveying mechanism 115. In various embodiments, the one or more additional image/acquisition devices may include components substantially similar to the image/acquisition device 401. For example, the one or more additional image/acquisition devices may include or be associated with one or more imaging devices and one or more scanners, readers, interrogators, and similar words used herein interchangeably, as described above in regards to the image/acquisition device 401. However, the one or more additional image/acquisition devices may include fewer components than image/acquisition device 401. For example, the one or more additional image/acquisition devices may not include a scanner, reader, interrogator, or similar words used herein, and may be configured to receive parcel/item/shipment identifiers from the image/acquisition device 401.

IV. Exemplary System Operation

Existing and conventional technologies fail to capture images of objects, generate damage data, such as the damage analyses described herein, and/or make various modifications based on the damage data. For example, some technologies, such as IoT devices (e.g., smart speakers) fail to include image capturing devices and back-end systems that determine whether damage to parcels have occurred. Although some IoT devices can cause an altering of devices (e.g., a smart thermostat) based on receiving user voice input, these IoT devices are not yet able to modify conditions (e.g., slow/halt an autonomous vehicle) in response to detecting damage of one or more parcels along a transit route (e.g., the transit route 700 of FIG. 7). As described above, some particular technologies in the shipping industry only include passive software applications that receive user input to identify whether one or more parcels are damaged. However, these applications fail to employ machine learning and other functionalities to help detect and analyze damage to parcels.

Various embodiments of the present disclosure improve these existing technologies in at least the following ways. After one or more digital images are received, some embodiments allow a feeding of the one or more digital images through one or more machine learning models in order to predict or classify (with more accuracy than existing software applications) whether one or more parcels represented in the one or more digital images have incurred damage, belong to a particular category of damage, and/or other functionalities associated with the damage (e.g., mitigation instructions). Some embodiments, also address the shortcomings of IoT devices, by providing a signal (e.g., a control signal) to one or more computing devices based on damage analyzation. The signal may cause the computing device itself and/or a condition (e.g., temperature in a vehicle) to be modified.

In some embodiments of the present disclosure, several digital images of a single parcel/item/shipment can be captured, at or along points in a transportation and logistics network, from various angles such that several fields of view are represented (e.g., a top, frontal, side, and bottom view). The images of a single parcel at each single point are combined and fed into a machine learning model in some embodiments. According to embodiments, the machine learning model is trained using known images of damaged parcels as well as types of damage, severity of damage, cost associated with the damage, and cause of the damage. The model is trained in either a supervised or semi-supervised manner. In some embodiments, however, the model is not trained, such that the model is unsupervised. Accordingly, every data input can be ingested or fed through the model and a corresponding output is generated without regard to monitoring or feedback of the output.

In embodiments, the model can then be called by an interfacing application or system and return a prediction according to what data the model is designed to predict. The predictive output of the machine learning model can include, for example, an indication of damage detected from the digital images, a diagnosis and/or characterization of the damage, an estimated cost associated with the damage, as well as one or more possible causes of the damage. The predictive output also enables pin-pointing (e.g., via Global Positioning System (GPS) geo-coordinates) where in the transportation and logistics network the damage is occurring.

According to some embodiments, events are driven based upon the predictive output of the machine learning model. For example, if a point in the transportation and logistics network is deemed as the location of several similar types of damage, an automated adjustment can be made to equipment or conditions at that point to avoid or limit future damage to parcels.

Parcels within a transportation and logistics network can traverse multiple locations. At any location within the carrier's logistic network, or between points for that matter, damage of any type may be caused to a parcel. Damage to parcels can be costly and difficult to pin point, mitigate, and prevent through the use of tedious and clumsy human/visual estimation.

The inventors have determined that resources dedicated to such assessment and mitigation of parcel damage are easily exhausted due to the unpredictable complexity of a route traversed by a parcel through a carrier's logistic network. Further, the inventors have determined that time to mitigation is inexcusably compromised due to human error.

As such, the inventors have determined that the ability to capture multiple digital images representing the condition of a parcel throughout a carrier's logistic network and programmatically assess and mitigate any damage as it occurs dramatically increases the efficient use of computing resources.

FIG. 7 illustrates an exemplary parcel transit route 700 for use with embodiments of the present disclosure. In various embodiments, a parcel transit route 700 may comprise a plurality of parcel interaction points 701-707 through which a parcel 710 traverses from origin 701 to destination 707. In the example illustrated in FIG. 7, an origin interaction point 701 may be a residence from where the parcel 710 is originally retrieved by a parcel transit service.

The parcel 710 may interact with a second parcel interaction point 702, which may be a manual delivery vehicle 100 as defined above. The parcel 710 may continue through the parcel carrier's logistic network to a next parcel interaction point 703, which may be inside or at a vehicle 712, such as a hand truck or forklift type assistance device for moving the parcel from the manual delivery vehicle 100 to or within a package center or hub or other parcel storage facility. The vehicle 712, in some embodiments, may alternatively be a conveying mechanism 115 as defined herein.

The parcel 710 may interact with a next parcel interaction point 704, which in some embodiments may be a package center or hub or other parcel storage facility, such as a sorting facility. Next, the parcel 710 may interact with a next parcel interaction point 705, which may be a hand truck or forklift type assistance device for moving the parcel from the package center or hub to a manual delivery vehicle 100 and/or within a package center or hub and/or to a conveying mechanism 115 as defined herein.

Next, the parcel 710 may interact with an autonomous vehicle 140 or manual delivery vehicle 100 (e.g., as described with reference to FIG. 4) at a next parcel interaction point 706. Finally, in this embodiment, the parcel 710 interacts with a destination interaction point 707, which may be a residence or point of business.

Throughout the parcel carrier's logistic network 700 that is traversed by a parcel 710, some or each parcel interaction point 701-707 (and/or areas between the points 701-707) is equipped according to the present disclosure with one or more digital image capture mechanisms/systems and/or other identification capturing mechanism (e.g., the image/acquisition device 401 as defined herein). As parcel 710 traverses through parcel transit route 700, some or each of the interaction points, and/or paths along these points, may include a digital image capture mechanism/system that captures one or more digital images representing one or more fields of view of the parcel 710.

In an illustrative example of image capturing at or along some or each of these interaction points, in some embodiments, a first digital image capture mechanism can be fastened to a worker or driver (e.g., on an article of clothing) of the vehicle 100. Accordingly, between the time at which the driver approaches or picks up the parcel 710 at interaction point 701 and when the driver places the parcel 710 in a storage location within the vehicle 100 at the second parcel interaction point 702, the first digital image capture mechanism may capture images or detect any potential damage to the parcel 710 that the driver may cause via the handling of the parcel 710. In another example, the storage location within the vehicle 100 at the second parcel interaction point 702 may additionally or alternatively include a second digital image capture mechanism, such that it captures images or detects any damage incurred to the parcel 710 while the vehicle 100 is traveling and while the parcel 710 is within a field of view of the second digital image capture mechanism. In another example, the first digital image capture mechanism fastened to the driver can capture images or detect damage to the parcel 710 between a stopping time of the vehicle 100 and a time at which the driver arrives to the vehicle 712 within the next parcel interaction point 703. The vehicle 712 may alternatively or additionally further include a third digital image capture mechanism configured to capture images or detect damage to the parcel 710 while the user of the vehicle 703 is engaging with the parcel 710 (e.g., lifting the parcel 710 via a forklift). In yet another example, a fourth digital image capture mechanism may be fasted to the user 716 of the vehicle 712. Accordingly, in some embodiments, the fourth digital image capture mechanism is configured to capture images of the parcel 710 and/or detect damage between the interaction points 703 and 704. In some embodiments, the interaction point 704 represents a warehouse or other intermediate facility that includes the environment as described with reference to FIG. 6A. Accordingly, in some embodiments the environment includes a fifth digital image capture mechanism (the image capture system 400). In some embodiments, the vehicle 720 and/or the user 717 alternatively or additionally includes a sixth digital image capture mechanism to detect damage and/or capture images between the picking up of the parcel 710 at the parcel interaction point 704 and the dropping off of the parcel at the interaction point 706. In some embodiments, the autonomous vehicle 140 is within the interaction point 706 and additionally or alternatively includes a seventh digital image capture mechanism such that images and/or damage of the parcel 710 can be detected between the time the autonomous vehicle 140 leaves the interaction point 706 (e.g., a top of the vehicle 100) and the drop off of the parcel 710 at the interaction point 707.

It will be appreciated that, throughout the parcel carrier's logistic network 700 that is traversed by a parcel 710, each interaction point 701-707 may be any one of the types of parcel interaction points as defined herein. For example, instead of origin interaction point 701 being a residence, it may be a place of business. In another example, instead of destination interaction point 707 being a residence, it may be a place of business. As such, it will be appreciated that multiple intervening parcel interaction points can be present and traversed by parcel 710 within the parcel carrier's logistic network 700. It will also be appreciated that a parcel carrier's logistic network may have fewer or more interaction points than are depicted in the example in FIG. 7.

FIG. 6B illustrates an exemplary multi-view image capture system for use with embodiments of the present disclosure. As will be recognized, and as described above, various types of imaging devices and systems 401 can be used to capture digital images and other information/data about a parcel 710—including imaging devices and systems associated with manual delivery vehicles 100, analysis computing entities 105, mobile computing entities 110, one or more autonomous vehicles 140, and/or the like (at various points in the transportation and logistics network). The digital images may comprise timestamps indicative of the time they were captured, location information/data (e.g., geo-coordinates) indicative of the location they were captured, device/entity information/data indicative of the device/entity that captured the digital images, and/or the like. In embodiments, parcel interaction points and/or points along a carrier's logistic network are equipped with data or digital image capturing mechanisms/devices 401A-401N through which one or more of a plurality of fields of view of a parcel 710 can be captured and transmitted from the parcel interaction point to an analysis computing entity 105 via one or more networks 135.

In embodiments, a parcel 710 may be surrounded by a plurality of acquisition devices 401A-401N. Each image/acquisition device 401A-401N has associated therewith a field of view or pose view 403A-403N representing various views of the parcel 710. Digital files representing identifying information/data, including digital images or otherwise (e.g., including parcel identification information as described herein), are transmitted from devices/mechanisms 401A-401N to analysis computing entity 105 via one or more networks 135.

In embodiments, a parcel 710 may be associated with a rotation mechanism such that a single image/acquisition device 401 (and/or other appropriate computing entity) may capture multiple digital images representing different fields of view of the parcel 710 (i.e., without the need for multiple acquisition or collection devices). In such embodiments, a signal acquisition device 401 (and/or other appropriate computing entity) may locally store all acquired/collected images and/or data to be transmitted in a single transmission to an analysis computing entity 105 via one or more networks 135. And as will be recognized, various other entities (such as those described above) can be used to capture one or more images of parcel 710.

FIG. 8 illustrates an example process 800 for use with embodiments of the present disclosure. The process 800 and/or 900 may be performed by processing logic that comprises hardware (e.g., circuitry, dedicated logic, programmable logic, microcode, etc.), software (e.g., instructions run on a processor to perform hardware simulation), firmware, or a combination thereof. In embodiments, multiple views (e.g., from some or each of the image/acquisition devices 401) of a parcel are digitally combined in order to be processed by a machine learning model. In some embodiments, an analysis computing entity 105 according to the present disclosure performs processing using the machine learning model. It will be appreciated that there are a variety of multi-view learning approaches that may be employed to arrive at a multi-view damage prediction assessment and mitigation result as described herein. The following description is provided for exemplary purposes only.

In embodiments, each digital image representing one of a plurality of fields of view is processed such that each pixel of the digital image is extracted (Operation/Step). The extracted pixels are used to determine whether any overlap exists between fields of view of each of the digital images (Operation/Step 802). If overlaps exist, those pixels associated with the overlaps are removed (Operation/Step 803). The resulting digital information representing fields of view without overlaps, along with additional identifying information related to the parcel as described herein, are provided to a machine learning model (Operation/Step 804) at an analysis computing entity 105 via one or more networks 135 according to embodiments of the present disclosure.

FIG. 9 illustrates an example process 900 for use with embodiments of the present disclosure. According to particular embodiments, an analysis computing entity 105 of the present disclosure receives a first plurality of parcel digital images from an origin interaction point (Operation/Step 901). In some embodiments, the first plurality of parcel digital images is associated with a parcel being transported from the origin interaction point to the destination interaction point via the plurality of parcel interaction points along a parcel carrier's logistic network. For example, the plurality of parcel digital images can be taken at the origin interaction point and/or from the origin interaction point to a next interaction point. An example of a parcel carrier's logistic network 700 is depicted in FIG. 7. In embodiments, additional identifying information/data related to the parcel is also received by the analysis computing entity 105.

Process 900 continues with the analysis computing entity 105 of the present disclosure receiving a second plurality of parcel digital images of the parcel from a first parcel interaction point of the plurality of parcel interaction points (Operation/Step 902). In some embodiments, the first plurality of parcel digital images and the second plurality of parcel digital images represent a plurality of fields of view of the parcel at different locations along a parcel carrier's logistic network (e.g., some or each parcel interaction point (and/or along such points) of the parcel carrier logistic network 700). In embodiments, additional identifying information related to the parcel is also received by the analysis computing entity 105.

Process 900 continues with the analysis computing entity 105 of the present disclosure programmatically generating a first parcel damage analysis based upon the first plurality of parcel digital images, the second plurality of parcel digital images, and a machine learning model (Operation/Step 903). In some embodiments, the first parcel damage analysis is also based upon any additional identifying information related to the parcel that has been received by the analysis computing entity 105.

The parcel damage analysis can include any suitable machine learning or object recognition method for detecting and analyzing the damage. For example, in some embodiments, the analysis computing entity 105 includes a data store of parcel images of parcels that are damaged and are not damaged outside of a threshold. Accordingly, when a received image is analyzed, the image of the parcel may be compared against one or more images within the data store. If there is a match (or substantial match) between the received image(s) and the image(s) within the data store, there may be no damage. To the contrary, if the images do not match or are outside of a threshold (e.g., the received image includes a compressed corner of a package and the data store of images does not include the compressed corner), transit network interaction point damage analyses can be generated and transmitted, as described in operations 906 and 907. In some embodiments, machine learning models are used to help classify whether particular input parcel images correspond to damaged or not damaged parcels, particular types of damage, and/or other parameters associated with parcel damage as describe herein. In some embodiments, these models are trained using historical digital images of known damage parcels and/or images of known non-damaged parcels. In this way, the system can determine when a parcel is damaged and how it is damaged based on one or more historical patterns or known object recognition damage characteristics of past images.

In an example illustration of how machine learning models can be used to classify parcel damage or come up with target variables, one or more neural networks (e.g., convoluted neural networks) can be used. Various categories or classifications can first be identified, such as parcels that are "damaged" or "not damaged." Other classification examples may additionally or alternatively be damage types, such as "water damage," "heat damage," "compression damage," "tension damage," "bending damage," "shear damage." The neural network can include a convolutional layer, a pooling layer, and a fully connected layer. The machine learning model neural network may be fed or receive as input one or more images of parcels at the convolutional layer. Each input image can be transformed into a 2-D input vector array of values, such as integers of ones and zeroes. Each value represents or describes a particular pixel of the image and the pixel's intensity. For instance, each line or edge of a parcel in the image can be denoted with a one and each non-line can be represented with zeroes. The convolutional layer utilizes one or more filter maps, which each represent a feature (e.g., a sub-image) of the input image (e.g., a corner of a parcel, mid-section of a parcel, top of parcel, etc.). There may be various features of an image and thus there may be various linearly stacked filter maps for a given image. A filter map is also an array of values that represent sets of pixels and weights where a value is weighted higher when it matches a corresponding pixel or set of pixels in the corresponding section of the input image. The convolution layer includes an algorithm that uses each filter map to scan or analyze each portion of the input image. Accordingly, each pixel of each filter map is compared and matched up against a corresponding pixel in each section of the input image and weighted according to similarity. In some embodiments, the convolutional layer performs linear functions or operations to arrive at the filter map by multiplying each image pixel value with its own value and then performing a summation function of each product, which is then divided by the total quantity of pixels in the image feature.

In particular embodiments, the pooling layer reduces the dimensionality or compresses each feature map by picking a window size (i.e., a quantity of dimensional pixels that will be analyzed in the feature map) and selecting the maximum value of all of the values in the feature map as the only output for the modified feature map. In some embodiments, the fully connected layer maps votes for each pixel of each modified feature to each classification (e.g., types of damages, "damaged," or "not damaged," etc.). The vote strength of each pixel is based on its weight or value score. The output is a score (e.g., a floating point value, where 1 is a 100% match) that indicates the probability that a given input image or set of modified features fits within a particular defined class (e.g., damaged or not damaged). For example, an input image may include a first picture of a parcel that has a large dent. The classification types may be "water damage," "puncture damage," and "dent damage." After the first picture is fed through each of the layers, the output may include a floating point value score for each damage classification type that indicates "water damage: 0.21," "puncture damage: 0.70," and "dent damage: 0.90," which indicates that the parcel of the parcel image likely has experienced dent damage, given the 90% likelihood. Training or tuning can include minimizing a loss function between the target variable or output (e.g., 0.90) and the expected output (e.g., 100%). Accordingly, it may be desirable to arrive as close to 100% confidence of a particular classification as possible so as to reduce the prediction error. This may happen overtime as more training images and baseline data sets are fed into the learning models so that classification can occur with higher prediction probabilities. In some embodiments, the severity of the damage is additionally classified (e.g., "slight damage," "moderate damage," and "heavy damage") in response to detecting or determining damage. In these embodiments, the machine learning model can function according to the steps described above. The system also re-trains itself with each processed digital image. Accordingly, the more images it processes, the better it gets or the more accurate the prediction becomes.

If a severity of the first parcel damage analysis satisfies (e.g., is below) a threshold (Operation/Step 904), the analysis computing entity 105 of the present disclosure transmits a first transit network interaction point condition confirmation based upon the first parcel damage analysis (Operation/Step 905). For example, the analysis computing entity 105 can transmit, via the network 135, a notification to computing entity 110 the indicating that there is no damage to the parcel and accordingly, the travelling or traversing of the parcel may continue down the transit network.

If the severity of the first parcel damage analysis fails to satisfy (e.g., is above) the threshold (Operation/Step 904), the analysis computing entity 105 of the present disclosure programmatically generates a first transit network interaction point damage analysis based upon the first parcel damage analysis and the machine learning model (Operation/Step 906). In embodiments, the analysis computing entity 105 of the present disclosure then transmits a first transit network interaction point damage mitigation instruction (e.g., to the mobile computing entity 110) based upon the first transit network interaction point damage analysis (Operation/Step 907). The mitigation instruction can be also be based on the time, location, and/or device/entity information/data in the digital images. In some embodiments, analysis computing entity 105 transmits a transit network interaction point damage mitigation instruction comprising a control signal to automatically stop, slow, modify, or alter a conveying mechanism 115 or any other device. In some embodiments, analysis computing entity 105 transmits a transit network interaction point damage mitigation instruction comprising a control signal to one or more devices in order to automatically adjust environmental controls (e.g., temperature, humidity, water controls, opening/closing of windows or doors) within a manual delivery vehicle 100, autonomous vehicle 140, package center or hub or other parcel storage facility, and the like.

In some embodiments, a signal (e.g., a notification and/or a control signal) may be provided to any suitable computing device based at least on the determining of the likelihood associated with damage of one or more parcels. The providing of the signal may modify a computing device or a condition (e.g., adjust temperature, change air conditioning, open/close door etc.), such as described above. For example, the modifying may include causing (e.g., by the analysis computing entity 105) a computing device (e.g., the mobile computing entity 110) to display a notification indicating damage analysis and/or damage analysis summary. In another example, the modifying may be or include causing one or more computing devices (e.g., via a control signal) to modify one or more environmental conditions, such as causing an autonomous vehicle apparatus to slow down or stop. The providing of the signal in particular embodiments includes the transit network interaction point condition confirmation and/or a mitigation instruction, as described herein, which can modify a computing device by causing the computing device to display the mitigation instruction and/or transit network interaction point condition confirmation.

In some embodiments, analysis computing entity 105 transmits a transit network interaction point damage mitigation instruction comprising a repackage and/or rewrap instruction to a mobile computing entity 110 operated by a user. In such embodiments, a display is rendered on the mobile computing entity 110 providing a notification to the user that a particular package is to be repackaged or rewrapped due to damage to its exterior.

In some embodiments, analysis computing entity 105 transmits a transit network interaction point damage mitigation instruction comprising a notification to one or more computing entities operated by a user, a customer (e.g., shipper or receiver), and the like. In such embodiments, the notification renders on a display of the corresponding computing entity providing an indication of damage to a parcel and/or mitigation measures taking place as a result of the known damage.

In some embodiments, a transit network interaction point damage mitigation instruction can comprise signals to multiple entities throughout a carrier's logistic network. For example, a transit network interaction point damage mitigation instruction may comprise a control signal to automatically stop, slow, or alter/modify a conveying mechanism 115. Such a transit network interaction point damage mitigation instruction may also provide for re-routing of packages already in contact with or scheduled to have contact with the conveying mechanism. Such a transit network interaction point damage mitigation instruction may also provide for notifying one or more mobile computing entities 110 that a conveying mechanism has been slowed/stopped/altered and that packages have been re-routed as a result. Such a transit network interaction point damage mitigation instruction may also provide for notifying a customer of any potential delay in delivery of parcels impacted by the instruction.

In some embodiments, analysis computing entity 105 transmits a transit network interaction point damage mitigation instruction comprising a control signal to automatically stop, slow, or alter an autonomous vehicle 140 (and/or vehicle 100). In additional embodiments, such a transit network interaction point damage mitigation instruction may also provide for re-routing of packages already in contact with or scheduled to have contact with the autonomous vehicle 140. Such a transit network interaction point damage mitigation instruction may also provide for notifying one or more mobile computing entities 110 that an autonomous vehicle 140 has been slowed/stopped/altered and that packages have been re-routed as a result. Such a transit network interaction point damage mitigation instruction may also provide for notifying a customer (e.g., via auditory instruction) or customer's computing device of (e.g., via a displayed notification) any potential delay in delivery of parcels impacted by the instruction.

In some embodiments, analysis computing entity 105 transmits a transit network interaction point damage mitigation instruction comprising a control signal to automatically schedule maintenance to a manual delivery vehicle 100. In such an embodiment, a maintenance provider may automatically be dispatched to the manual delivery vehicle 100 based on GPS coordinates associated with the manual delivery vehicle 100. In additional embodiments, such a transit network interaction point damage mitigation instruction may also provide for re-routing of packages already in contact with or scheduled to have contact with the manual delivery vehicle 100. Such a transit network interaction point damage mitigation instruction may also provide for notifying one or more mobile computing entities 110 that manual delivery vehicle 100 has been scheduled for maintenance and that packages have been re-routed as a result. Such a transit network interaction point damage mitigation instruction may also provide for notifying a customer of any potential delay in delivery of parcels impacted by the instruction.

In embodiments of the present disclosure, the analysis computing entity 105 receives (e.g., from the camera 326) identifying information associated with a parcel in addition to digital images representing the parcel. In embodiments, other information associated with an interaction point may be received or determined by the analysis computing entity 105. Such information may include metadata, such as temperature at the time the image was taken, time of day the image was taken, typical ambient conditions at the time the image was taken, historical damage risk, and the like. In some embodiments, this identifying information helps generate the first parcel damage analysis and/or helps generate mitigation instructions. For example, if the ambient temperature is over 115 degrees Fahrenheit combined with loosely fitting or detached packaging tape as identified by an imaging capturing device, an inference may be made based on both of these two observations that heat has caused the package to become unstable. Accordingly, a mitigation instruction can be sent from the computing entity 105 to the mobile computing entity 110 indicating that new tape should be used to re-rap the package, as well as a mitigation instruction that causes a vehicle to lower its air conditioner to a cooler temperature.

In embodiments of the present disclosure, all information related to damage analyses and condition confirmations is logged by the analysis computing entity 105 and stored in one or more associated non-volatile storage devices 210 (e.g., databases or data stores as described herein) and/or volatile storage devices.

In embodiments of the present disclosure, notifications may be provided based upon any determination or status to a shipper, a receiver, and/or internally to a parcel transit provider.

According to embodiments, the present system receives digital images of parcels at various points throughout a transportation and logistics network. Particular embodiments of the present disclosure detect, characterize, diagnose, and root-cause any damage based upon a trained machine learning model. In embodiments, the machine learning model is a convolutional neural network.

The details of one or more embodiments of the subject matter described in this specification are set forth in the accompanying drawings and the description below. Other features, aspects, and advantages of the subject matter will become apparent from the description, the drawings, and the claims.

The methods, apparatus, and computer program products described herein are further operable to receive a second plurality of parcel digital images of the parcel from a first parcel interaction point of the plurality of parcel interaction points, the first plurality of parcel digital images and the second plurality of parcel digital images representing a plurality of fields of view of the parcel.

The methods, apparatus and computer program products described herein are further operable to programmatically generate a first parcel damage analysis based upon the first plurality of parcel digital images, the second plurality of parcel digital images, and a machine learning model.

The methods, apparatus and computer program products described herein are further operable to, upon determining that a severity of the first parcel damage analysis is below a threshold, transmit a first transit network interaction point condition confirmation based upon the first parcel damage analysis.

The methods, apparatus and computer program products described herein are further operable to, upon determining that the severity of the first parcel damage analysis is above the threshold, programmatically generate a first transit network interaction point damage analysis based upon the first parcel damage analysis and the machine learning model, and transmit a first transit network interaction point damage mitigation instruction based upon the first transit network interaction point damage analysis.

Optionally, in embodiments of the present disclosure, the first parcel damage analysis comprises determining a first plurality of pose ranges for the first plurality of parcel digital images.

Optionally, in embodiments of the present disclosure, the first parcel damage analysis further comprises determining a second plurality of pose ranges for the second plurality of parcel digital images.

Optionally, in embodiments of the present disclosure, the first parcel damage analysis further comprises determining a first plurality of parcel view overlaps based upon the first plurality of pose ranges and determining a second plurality of parcel view overlaps based upon the second plurality of pose ranges.

Optionally, in embodiments of the present disclosure, the first parcel damage analysis further comprises programmatically generating the first parcel damage analysis based upon the first plurality of parcel view overlaps, the second plurality of parcel view overlaps, and the machine learning model.

Optionally, in embodiments of the present disclosure, the first transit network interaction point damage analysis comprises a first transit network interaction point identifier, a parcel identifier, and a first parcel damage analysis summary.

Optionally, in embodiments of the present disclosure, the parcel damage analysis summary comprises one or more of a parcel type, a parcel damage type, a parcel damage location identifier, a parcel damage severity, a parcel damage mitigation recommendation, and a parcel damage restoration estimate.

Optionally, in embodiments of the present disclosure, the first transit network interaction point damage mitigation instruction comprises one or more electronic signals for modifying one or more conditions at a transit network interaction point based upon the parcel damage mitigation recommendation.

The methods, apparatus and computer program products described herein are further operable to receive a third plurality of parcel digital images of the parcel from a second parcel interaction point of the plurality of parcel interaction points, the third plurality of parcel digital images representing the plurality of fields of view of the parcel.

The methods, apparatus and computer program products described herein are further operable to programmatically generate a second parcel damage analysis based upon the first plurality of parcel digital images, the second plurality of parcel digital images, the third plurality of parcel digital images, and the machine learning model.

The methods, apparatus and computer program products described herein are further operable to, upon determining that a second severity of the second parcel damage analysis is below a second threshold, transmit a second transit network interaction point condition confirmation based upon the second parcel damage analysis.

The methods, apparatus and computer program products described herein are further operable to, upon determining that the second severity of the second parcel damage analysis is above the second threshold, programmatically generate a second transit network interaction point damage analysis based upon the second parcel damage analysis and the machine learning model and transmit a second transit network interaction point damage mitigation instruction based upon the second transit network interaction point damage analysis.

Optionally, in embodiments of the present disclosure, the second parcel damage analysis comprises determining a third plurality of pose ranges for the third plurality of parcel digital images.

Optionally, in embodiments of the present disclosure, the second parcel damage analysis further comprises determining a third plurality of parcel view overlaps based upon the third plurality of pose ranges.

Optionally, in embodiments of the present disclosure, the second parcel damage analysis further comprises programmatically generating the second parcel damage analysis based upon the second plurality of parcel view overlaps, the third plurality of parcel view overlaps, and the machine learning model.

Optionally, in embodiments of the present disclosure, the second transit network interaction point damage analysis comprises a second transit network interaction point identifier, a parcel identifier and a second parcel damage analysis summary.

Optionally, in embodiments of the present disclosure, the second parcel damage analysis summary comprises one or more of a parcel type, a parcel damage type, a parcel damage location identifier, a parcel damage severity, a parcel damage mitigation recommendation, and a parcel damage restoration estimate.

Optionally, in embodiments of the present disclosure, the second transit network interaction point damage mitigation instruction comprises one or more electronic signals for modifying one or more conditions at a transit network interaction point based upon the parcel damage mitigation recommendation.

Optionally, in embodiments of the present disclosure determining a likelihood associated with a damage of the first parcel includes determining a likelihood includes: identifying a set of output classification categories that specify whether a given parcel is damaged or not damaged outside of a threshold, receiving a historical set of digital images, feeding the historical set of digital images through a machine learning model, outputting, via the machine learning model, each of the historical set of digital images into one of the set of output classifications based on scoring the historical set of digital images, tuning (e.g., training) the machine learning model based on the outputting, and in response to feeding the first parcel digital image through the machine learning model, outputting the first parcel digital image into one of the set of output classifications based on the tuning of the machine learning model. Some or each of these steps are described in more detail with reference to FIG. 7.

Optionally, in some embodiments of the present disclosure upon determining that a severity of a first parcel damage analysis is above a threshold, a first transit network interaction point damage analysis can be generated based upon the first parcel damage analysis and a machine learning model. In response to determining that the severity of the first parcel damage analysis being above the threshold, a transit network interaction point damage mitigation instruction can be provided. The transit network interaction point damage mitigation instruction may include providing an instruction to a device within a carrier route that includes the first interaction point and the second interaction point. The mitigation instruction may include a control signal to modify a condition to mitigate the damage. These operations are further described with reference to "parcel damage mitigation," FIG. 9, under the "exemplary system operation" heading contained herein, and various other paragraphs.

Optionally, in some embodiments of the present disclosure, the modification of a computing device or condition includes adjusting one or more environmental controls within a manual delivery vehicle, an autonomous vehicle, or a parcel storage facility, as described with reference to at least to "parcel damage mitigation," FIG. 9, under the "exemplary system operation" heading contained herein, and various other paragraphs.

Optionally, in some embodiments of the present disclosure, a providing of a signal to a second computing device includes causing the second computing device to display a notification that indicates how to mitigate the damage, as described with reference to at least the "transit network interaction point damage mitigation instruction," operation 905 of FIG. 9, or any discussion of FIG. 9.

V. Conclusion

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

What is claimed is:

1. A system comprising:
   at least one first computing device having at least one processor; and
   at least one computer readable storage medium having program instructions embodied therewith, the program instructions readable or executable by the at least one processor to cause the system to:
   receive a first parcel digital image captured from a first field of view within a parcel transit network, the first parcel digital image includes a first representation of a first parcel, the parcel transit network corresponds to a plurality of physical locations traversed by the first parcel along one or more parcel transit routes;
   receive a second parcel digital image captured from a second field of view within the parcel transit network, the second parcel digital image includes a second representation of the first parcel;
   based at least in part on analyzing pixel variations between the first parcel digital image and the second parcel digital image, determining a likelihood associated with a damage of the first parcel; and
   based at least on the determining of the likelihood associated with the damage, providing a signal to a second computing device, the providing causes the computing device to be modified or a condition to be modified.

2. The system of claim 1, wherein the providing of the signal to the second computing device includes a control signal that causes a modification of the condition within the parcel transit network.

3. The system of claim 1, wherein the modification includes adjusting one or more environmental controls within a manual delivery vehicle, an autonomous vehicle, or a parcel storage facility.

4. The system of claim 1, wherein the first parcel includes a likelihood of damage above a threshold, and wherein the providing of the signal to the second computing device includes causing the second computing device to display a notification that indicates how to mitigate the damage.

5. The system of claim 1, wherein the determining a likelihood includes:
   identifying a set of output classification categories that specify whether a given parcel is damaged or not damaged outside of a threshold;
   receiving a historical set of digital images;
   feeding the historical set of digital images through a machine learning model;
   outputting, via the machine learning model, each of the historical set of digital images into one of the set of output classifications based on scoring the historical set of digital images;
   tuning the machine learning model based on the outputting; and
   in response to feeding the first parcel digital image through the machine learning model, outputting the first parcel digital image into one of the set of output classifications based on the tuning of the machine learning model.

6. The system of claim 1, wherein the program instructions further cause the system to:
   determine that there are overlaps between fields of view of the first parcel digital image and the second parcel digital image;
   remove the overlaps between the fields of view; and
   in response to the removing of the overlaps, provide the first parcel digital image and the second parcel digital image to a machine learning model.

7. The system of claim 1, wherein the determination of the likelihood associated with the damage includes a parcel damage analysis summary that comprises one or more of: a parcel damage type, a parcel damage location identifier, a parcel damage severity, a parcel damage mitigation recommendation, and a parcel damage restoration estimate.

8. A computer-implemented method comprising
receive a first parcel digital image captured from a first physical location within a parcel transit network, the first parcel digital image includes a first representation of a first parcel, the parcel transit network corresponds to a plurality of physical locations traversed by the first parcel along one or more parcel transit routes;
receive a second parcel digital image captured from a second physical location within the parcel transit network, the second parcel digital image includes a second representation of the first parcel;
based at least in part on analyzing the first parcel digital image and the second parcel digital image, determining a likelihood associated with a damage of the first parcel; and
based at least in part on the determining of the likelihood associated with the damage, causing a computing device to display a notification indicating the damage.

9. The method of claim 8, wherein the notification includes specifying what steps a user must take to modify or mitigate the damage.

10. The method of claim 8, further comprising sending a control signal that includes adjusting one or more environmental controls within an autonomous vehicle based at least in part on the determining of the likelihood.

11. The method of claim 8, wherein the first parcel digital image is captured from a first field of view of the first parcel and the second parcel digital image is captured from a second field of view of the first parcel, wherein the determining of the likelihood associated with the damage is based at least in part on analyzing the first field of view and analyzing the second field of view.

12. The method of claim 8, wherein the determining a likelihood includes:
identifying a set of output classification categories that specify whether a given parcel is damaged or not damaged outside of a threshold;
receiving a historical set of digital images;
feeding the historical set of digital images through a machine learning model;
outputting, via the machine learning model, each of the historical set of digital images into one of the set of output classifications based on scoring the historical set of digital images;
tuning the machine learning model based on the outputting; and
in response to feeding the first parcel digital image through the machine learning model, outputting the first parcel digital image into one of the set of output classifications based on the tuning of the machine learning model.

13. The method of claim 8, further comprising:
combining the first parcel digital image and the second parcel digital image;
based on the combining, provide the first parcel digital image and the second parcel digital image to a machine learning model for the determining of the likelihood.

14. The method of claim 8, wherein the determining of the likelihood comprises determining a first pose range for the first parcel digital image, the first pose range corresponds to a restriction to what is visible to be captured by a digital image capturing device.

15. An apparatus for predictive parcel damage mitigation in a parcel transit network, the apparatus comprising at least one processor and at least one memory including computer program code, the at least one memory and the computer program code configured to, with the at least one processor, cause the apparatus to:
receive a first parcel digital image captured from a first field of view within a parcel transit network, the first parcel digital image includes a first representation of a first parcel, the parcel transit network corresponds to a plurality of physical locations traversed by the first parcel along one or more parcel transit routes;
receive a second parcel digital image captured from a second field of view within the parcel transit network, the second parcel digital image includes a second representation of the first parcel;
based at least in part on analyzing the first parcel digital image and the second parcel digital image, determining a likelihood associated with a damage of the first parcel; and
based at least on the determining of the likelihood associated with the damage, providing a signal to a second computing device.

16. The apparatus of claim 15, wherein the providing of the signal to the second computing device includes a control signal that automatically stops, slows, or modifies a conveying mechanism.

17. The apparatus of claim 15, wherein the modification includes adjusting one or more environmental controls within a manual delivery vehicle.

18. The apparatus of claim 15, wherein the determination of the likelihood comprises determining parcel view overlap duplication associated with the first parcel.

19. The apparatus of claim 15, wherein the determining a likelihood includes:
identifying a set of output classification categories that specify whether a given parcel is damaged or not damaged outside of a threshold;
receiving a historical set of digital images;
feeding the historical set of digital images through a machine learning model;
outputting, via the machine learning model, each of the historical set of digital images into one of the set of output classifications based on scoring the historical set of digital images;
tuning the machine learning model based on the outputting; and
in response to the tuning of the machine learning model, outputting the first parcel digital image into one of the set of output classifications.

20. The apparatus of claim 15, wherein the program code is further configured to cause the apparatus to:
determine that there are overlaps between fields of view of the first parcel digital image and the second parcel digital image;
remove the overlaps between the fields of view; and
in response to the removing of the overlaps, provide the first parcel digital image and the second parcel digital image to a machine learning model.

* * * * *